(12) United States Patent
Hou et al.

(10) Patent No.: US 8,195,690 B2
(45) Date of Patent: Jun. 5, 2012

(54) METHOD AND SYSTEM FOR CONSTRUCTING XML QUERY TO SCHEMA VARIABLE XML DOCUMENTS

(75) Inventors: Xue Qiao Hou, Beijing (CN); Hui-I Hsiao, San Jose, CA (US); Gang Hu, Beijing (CN); Bo Li, Beijing (CN); Yue Pan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 12/431,191

(22) Filed: Apr. 28, 2009

(65) Prior Publication Data

US 2009/0287670 A1    Nov. 19, 2009

(30) Foreign Application Priority Data

Apr. 29, 2008  (CN) .......................... 2008 1 0095594

(51) Int. Cl.
*G06F 7/00* (2006.01)
(52) U.S. Cl. ....................................... 707/774; 707/778
(58) Field of Classification Search .................. 707/774, 707/778
See application file for complete search history.

(56) References Cited

U.S. PATENT DOCUMENTS

| | | | |
|---|---|---|---|
| 6,446,060 B1 * | 9/2002 | Bergman et al. .............. | 707/770 |
| 6,925,457 B2 | 8/2005 | Britton et al. | |
| 7,293,010 B2 | 11/2007 | Angele et al. | |
| 2004/0044959 A1 | 3/2004 | Shanmugasundaram et al. | |
| 2006/0101073 A1 * | 5/2006 | Popa et al. .................. | 707/104.1 |
| 2006/0129575 A1 | 6/2006 | Lee et al. | |
| 2007/0022105 A1 | 1/2007 | Roux | |
| 2007/0130206 A1 | 6/2007 | Zhou et al. | |
| 2007/0208769 A1 | 9/2007 | Boehm et al. | |
| 2007/0233645 A1 | 10/2007 | Peterson et al. | |
| 2008/0162443 A1 * | 7/2008 | Asai et al. ......................... | 707/4 |

OTHER PUBLICATIONS

Fegaras, et al., "Query Engines for Web-Accessible XML Data," Proceedings of the 27th VLDB Conference, Roma, Italy, 2001.
Lin, et al., "Adaptive Data Mediation over XML Data," Journal of Applied System Studies (JASS), Cambridge International Science Publishing, 2001.
Maluf, et al., "An Extensible 'Schema-less' Database Framework for Managing High-throughput Semi-Structured Documents," Proceeding (394) Computer Science and Technology, 2003.
Popa, et al., "Mapping XML and Relational Schemas with Clio," Proceedings of the 18th International Conference on Data Engineering (ICDE'02), 2002.
Qian, et al., "Constructing Extensible XQuery Mappings for XML Data Sharing," APWeb 2005, LNCS 3399, 2005, pp. 290-295.
Chebotko, "XML subtree reconstruction from relational storage of XML documents," Data and Knowledge Engineering, vol. 62, Issue 2, 2007, pp. 199-218.

* cited by examiner

*Primary Examiner* — Amy Ng
(74) *Attorney, Agent, or Firm* — Vazken Alexanian

(57) ABSTRACT

An XML querying method and system for constructing an XQuery/XPath query to a schema variable XML document. The method includes: receiving the query from a client computer; generating a tree structure; and generating, by query rewriting, an XQuery/XPath for the XML document based on the tree structure and configurable query constraints. The system includes: a tree structure generating unit for generating a tree structure; and a query writing unit for generating an XQuery/XPath query for the XML document based on the tree structure and configurable query constraints.

6 Claims, 16 Drawing Sheets

METHOD AND SYSTEM FOR CONSTRUCTING XML QUERY TO SCHEMA VARIABLE XML DOCUMENTS

CROSS-REFERENCE TO RELATED APPLICATIONS

This application claims priority under 35 U.S.C. §119 to Chinese Patent Application No. 200810095594.3 filed Apr. 29, 2008, the entire contents of which are incorporated by reference herein.

BACKGROUND OF THE INVENTION

1. Field of the Invention

The present invention relates to methods and systems for constructing XML query, more particularly, to methods and systems for constructing XML query to schema variable XML documents.

2. Description of the Related Art

XML (eXtensible Markup Language) has been widely adopted in many domains to store and exchange data. In some domains, for example, the CDA (Clinical Document Architecture) for the healthcare industry or the XBRL (extensible Business Reporting Language) for the financial industry, the variable schema, which is a set of XML documents that share a similar but not an identical XML schema, is a common feature that makes it difficult for users to consume data in XML documents.

In order to construct a correct XQuery/XPath to extract data from these XML documents, users must completely understand each schema and how each data element in each schema relates to other elements, that is, the relationship of XML elements in a same XML document tree and the relationship of different XML trees, which usually takes too much effort or in some extreme circumstances (e.g., when there are too many schemas) may be impossible for users.

MDA (Model-Driven-Approach) modeling methods are used in many fields in order to use unified syntax to express and exchange complex data in a flexible manner. Using this methodology, by defining and modeling semantics, vocabularies, data structures and data at levels of meta model, model (schema) and instance respectively, different users can make extension/derivation from basic schemas according to their different requirements, so that various data express and exchange requirements can be satisfied under different circumstances.

FIG. 1 shows an XML modeling architecture which follows the MDA methodology 1000. The top level of the architecture is a Meta Model layer 1010, which includes the definitions of syntax and semantics of modeling notations, a Model level 1020 is defined according to the Meta model, which includes a terminology model 1021 defining common vocabularies and terms of specific domain, and a schema model 1022 defining common data structures of how to organize the common vocabularies and terms. At the lowest level, Data 1030, i.e., Instance layer, is provided under the Model level 1020.

FIG. 2 describes the hierarchical MDA modeling methodology shown in FIG. 1 using the XBRL as an example. As shown in FIG. 2, in the XBRL specification defined by the XBRL international organization, a Meta model is defined, including notations that can be used by financial reports to tag reporting items. For example, the 'substitutionGroup' attribute of each reporting item in a financial report should be tagged as either "item" or "tuple". Based on the meta model, regulators such as the SEC (Securities Exchange Commission) have defined some basic schemas and terms, e.g., vocabularies of reporting items. For instance, the SEC has defined the reporting item "Revenue" to be used in financial reports, and "Revenue" elements can be represented in income statements. Companies can extend these basic schemas by themselves to customize their own reporting templates. For example, if Company A has a definition in its schema extension, "Income"-"Revenue", then in the income statement of Company A, element "revenue" should be represented as sub node of element "income". If Company B has a definition in its schema extension "Accrued Income"-"Revenue", then this indicates that element "Revenue" is sub node of element "Accrued Income" in the income statement of Company B. Each company can also have specific data facts according to the extended schemas, e.g., specific data of reporting items defined in these schemas. For example, the value of the reporting item "Revenue" in the financial report of company A is "1,000,000 USD", the value of the item "Revenue" in the report of company B is "1,500,000 USD".

FIG. 3 describes the hierarchical MDA modeling architecture shown in FIG. 1 using the CDA as another example. As shown in FIG. 3, the CDA international organization has defined the syntax and semantics of notations that can be used by electronic clinical documents, e.g., a clinical document include data for specific elements such as "Entity", "Observation", "Symptom", "Body Structure", etc. Based on the above syntax, a standard organization, SNOMED (Systematized Nomenclature of Medicine) has further defined some common terms, i.e., vocabularies of clinical data. For example, SNOMED has defined terms, such as "Shadow" for "Observation" and "Chest" for "Body Structure". Based on such common syntax and terms, hospitals and equipment manufacturers can create extensions on the basic schema to obtain their own CDA document schemas. For example, hospital A can define a nested structure like "Entity"-"observation"-"body"-"symptom" and hospital B can define a nested structure like "Entity"-"body structure"-"symptom". Hospital A can produce data facts like "Tom"-"SNOMED CT"-"Chest"-"Shadow", indicating "a shadow of Tom's chest observed with SNOMED CT", which corresponds to the above schema: "Entity"-"observation"-"body"-"symptom"; and hospital B may produce data facts like "Lee"-"Chest"-"Shadow", indicating a shadow of Lee's chest, which corresponds to the above schema "Entity"-"body structure"-"symptom".

Users can query data in above XML documents. As shown in FIG. 2, financial data consumer (e.g., bank or investor) may want to know "the revenue changing trends of companies A and B in the past three years." Similarly, as shown in FIG. 3, a clinic data consumer (e.g., doctors or medicine makers) may want to know "the list of patients with shadow in chest." However, under existing techniques in the prior art, it is difficult to formulate queries because even though XML documents share a common syntax and vocabulary model, they can still be based on different schemas or data structures. When constructing an XML query for a document, even though there is a common vocabulary model that covers all elements involved in the queries, users still need to know the specific schema of each instance document. Data consumers have to understand each extended schema in order to correctly the XQuery/XPath thereby imposing a heavy burden on users.

An XQuery/XPath is a known query language in the prior art. XPath is a language for selecting nodes from XML documents. XQuery is a query language (with some programming language features) designed to query on XML data sets.

Referring to FIG. 2, even though the financial report of companies A and B share the common vocabularies for income statements (e.g., "Revenue"), they have different data structure to organize these same elements because of their own schema extensions. When querying the "Revenue" of companies A and B, the specific schema structures have to be understood by a user, i.e., in the extended schema defined by company A, element "Revenue" is the child node of element "Income", and in the extended schema defined by company B, element "Revenue" the child node of element "Accrued Income". It is necessary for users to get above information to construct a correct XPath/XQuery.

Referring to FIG. 3, although sharing the common syntax defined by CDA and the vocabularies defined by SNOMED, it is still possible for hospitals to extend the basic schema to obtain customized schemas that are suitable to their own business requirements. Examples include different customized schema like "Entity"-"observation"-"body"-"symptom" and "Entity"-"body structure"-"symptom". When answering questions like "patients with shadow in chest", information about detail structures of each different schema is required. For example, with respect to patient "Tom", the element "Shadow" is sub node of element "Chest", which is sub node of element "Observation", which in turn is the sub node of root element "Tom". As to patient "Lee", the element "Shadow" is sub node of element "Chest", which in turn is the sub node of root element "Lee". Accordingly, if there are a number of extended schemas, users need to know the specific structures of each schema in order to construct queries even if those schemas share the common syntax and vocabularies, i.e., the basic schema. This is an unnecessary burden to users.

FIG. 4 shows a set of shared vocabularies, including "element 1" to "element 5". These elements are referred by the extended schemas shown in FIGS. 5a and 5b, but they are organized in element trees with different structure in the extended schemas respectively. Comparing the different schemas shown in FIG. 5a and FIG. 5b, it can be seen that information of specific element nesting paths is required even though the same elements are queried. Therefore, in the prior art, when querying on XML documents with these extended schemas, for example, when querying elements 3, 4 and 5, paths to the elements being queried in the corresponding XML documents are first determined before constructing queries according to those paths. As mentioned before, this approach has a significant drawback because users have to know the specific structures of each schema.

Another existing approach in the prior art is a schema-less query by wildcard. However, wildcard queries can lose the relationship between elements being queried, and therefore is limited to queries for a single element. In the case where multiple elements are involved and the relationship therebetween has to be considered, wildcard queries cannot return desired results.

FIG. 6 shows the above shortcoming of wildcard query. A simple XML schema is shown on the top of FIG. 6, where "element_1" (sub node) and "element_2" (sub node) are located under "element_a" (root node).

An XML document is provided in FIG. 6:

```
<element_a>
    <element_1>1-1</element_1>
    <element_2>1-2</element_2>
</element_a>
<element_a>
    <element_1>2-1</element_1>
```

-continued

```
    <element_2>2-2</element_2>
</element_a>
```

The above XML segment has two data facts for "element_a", each of which includes two data facts "1-1", "1-2" and "2-1", "2-2" for "element_1" and "element_2" respectively. Assume a user want to get all of data facts of "element_1" and "element_2". When making a wildcard query (that is, a schema-less query), the user inputs query "\\element_1" and "\\element_2", and gets query results shown at the bottom of FIG. 6. Although data facts "1-1", "1-2", "2-1", and "2-2" are returned, the fact that the data facts "1-1", "1-2" should be joint and data facts "2-1", "2-2" should be joint are lost. In fact, what user really expects is the table shown in the middle of FIG. 6, wherein data facts "1-1", "1-2" and data facts "2-1", "2-2" are associated with each other respectively.

Therefore, existing approaches do not support how to make a query of data in schema variable XML documents even users do not have any knowledge about the data structures of specific XML schema, while the relationship between the elements are maintained in the returned query results.

SUMMARY OF THE INVENTION

The present invention provides a method and a system for constructing an XML query on schema variable XML documents and generates a proper XQuery/XPath query for any given query object.

In one aspect of the present invention, a system for constructing an XQuery/XPath query to an XML document, where the inputted query contains an element of the XML document includes: a tree structure generating unit for generating a tree structure; and a query rewriting unit for generating an XQuery/XPath query for the XML document based on the tree structure and configurable query constraints.

The tree structure generating unit includes: an extracting unit for extracting a nested relationship between elements of one or more XML documents; and a reasoning unit for reasoning tree structures to which the elements contained in the inputted query belong to each of the XML documents, based on the nested relationship extracted by the extracting unit. The extracting unit extracts anchors to which the elements refer to, as well as the nested relationship between the anchors, from the XML documents. Where an XML document is defined based on an XML schema, the extracting unit extracts the nested relationship between the elements from each XML schema. Where an XML document is a schema-less XML document, the extracting unit extracts the nested relationship between the elements from each XML document. The system can optionally include a constraint configuring unit for configuring constraint rules and a query evaluating unit for constraining the query.

In another aspect of this invention, a method for generating an XQuery/XPath query to an XML document, where the inputted query includes an element of the XML document, includes: receiving a user input query from a client computer, which includes a set of elements the user wants to query; generating a tree structure; and generating, by query rewriting, an XQuery/XPath query for each XML document, based on the tree structure and configurable query constraints. Generating the tree structure includes: extracting a nested relationship between elements of one or more XML documents; extracting anchors to which the elements refer to, as well as the nested relationship between the anchors from the XML documents; and inferring, by reasoning, the tree structures based on the nested relationship extracted at the extracting step. Where an XML document is defined based on an XML schema, the nested relationship between the elements from each XML schema is extracted. Where an XML document is a schema-less XML document, the nested relationship between the elements from each XML document is extracted. The method can optionally include configuring constraint rules and query-evaluating by constraining the XML query.

The present invention generates an XQuery/XPath query for a given query subject, which could be a set of known XML elements/complex elements; generates a constraints check about the reference to anchors; and the returned XQuery/XPath can be either used to query XML documents directly or to build path specific index for XML documents. In the above aspects of the present invention, the inter-relationship of the XML data is contained in the result of query. Further, data consumers need not know every specific schema used in multiple XML documents, thus greatly reducing users' efforts. Moreover, a user could pre-configure a constraint rule, or select a corresponding constraint rule while inputting a query, so that a more flexible query process is possible.

DETAILED DESCRIPTION OF THE PREFERRED EMBODIMENTS

XML documents usually separate the value (instance) of concepts into several segments within XML document sub-trees, and link the contexts, constraints and limitations of the values via Anchors (also called attribute-reference, context reference), which actually builds reference relationships between different XML sub trees. In order to illustrate the reference relationship between sub-trees, a description is given with reference to FIGS. 7 and 8 in view of a CDA document and an XBRL document.

The following example of a CDA meta model defines some principle elements (attribute) of CDA documents:
    header (meta data)
    Patient
    Document
    Author
    Authenticator
    Encounter
    . . . and more . . .
    body (clinical data)
    Observations
    Procedures
    Medications
    . . . and more . . .

A CDA document complying with the CDA specification is given as follows:

```
<text>
    <caption>Complications</caption>
    <content>
        <content ID="a1">Thrombocytes were taken on the
            <content ID="a2">second day post-bmt</content>
            and the count of Thrombocytes was
            <content ID="a3">not less than 25k</content>
            during the transplantation
        </content>
        ...
    </content>
</text>
<Observation>
    <moodCode V="EVN"/>
    <originalText><reference url="#a1"/></originalText>
    <code displayName="Thrombocytes" System="SNOMED"/>
    <value low="25" lowClosed ="true" unit="k">
        <originalText><reference url="#a3"/></originalText>
    </value>
    <effectiveTime value="second day post-bmt">
        <originalText><reference url="#a2"/></originalText>
    </effectiveTime>
</Observation>
```

The above text portion between the labels <text> and </text> means that the element "text" contains an element "content", and the element "content" further includes sub element "content" with "ID" tag "a1", which further includes one sub element "content" with "ID" tag "a2" and another sub element "content" with "ID" tag "a3".

"Observation" is defined in the text portion between labels <Observation> and </Observation>, including: "moodCode", which refers to an element whose ID tag is "a1"; "code" without any reference to other element; "value", which refers to an element whose ID tag is "a3"; and "effective time", which refers to an element whose ID tag is "a2". So this CDA document actually includes two sub trees that are logically linked together.

Figure 1:
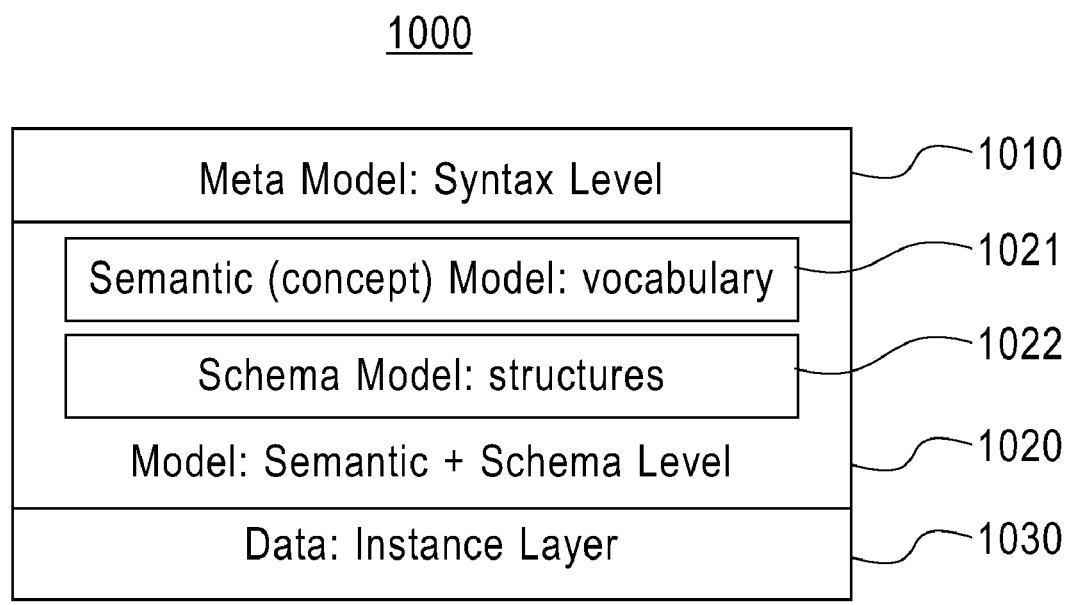
FIG. 1 shows an architecture which follows Model-Driven-Approach based XML modeling methodology.
Figure 2:
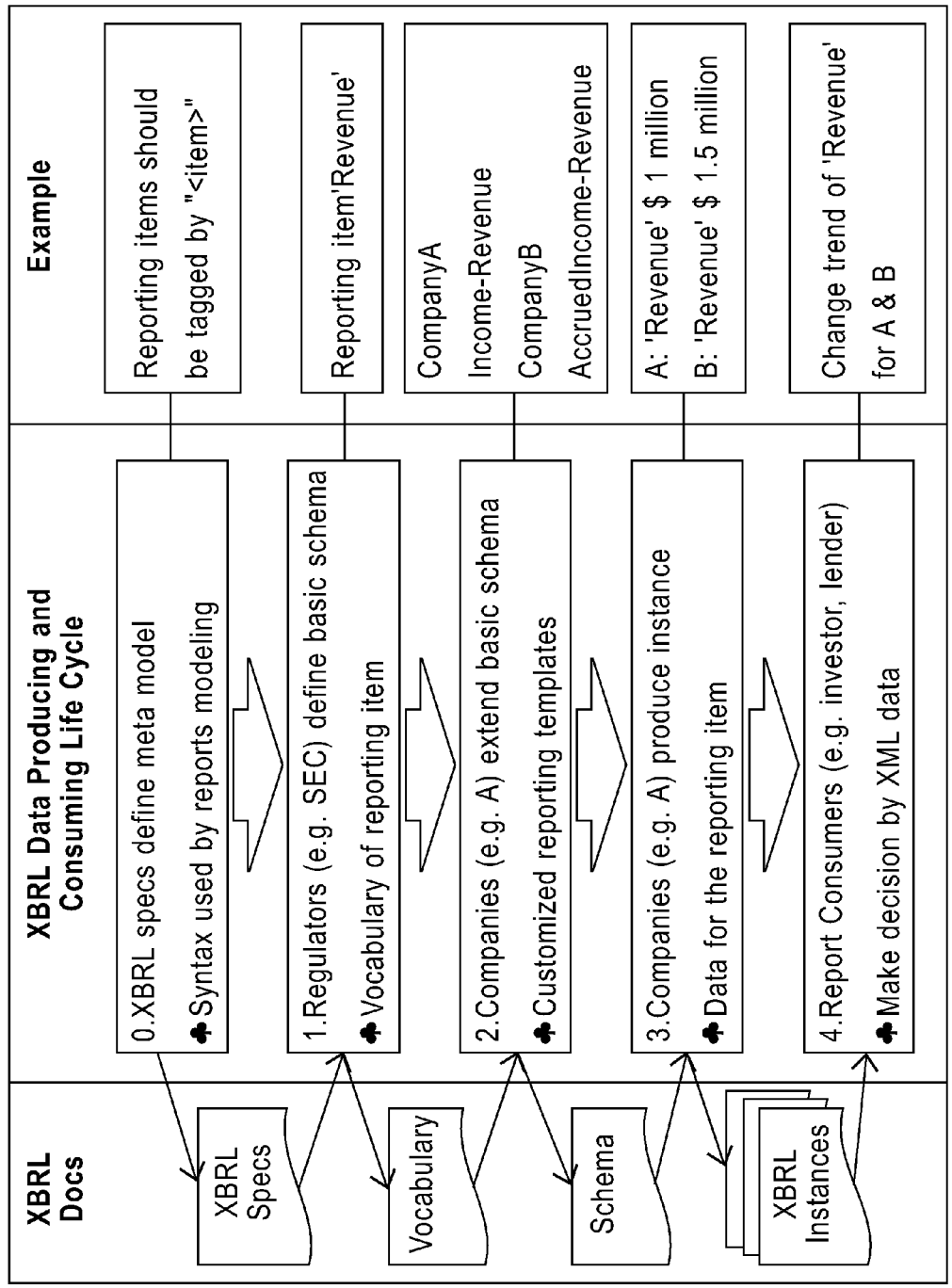
FIG. 2 shows an example of XBRL in accordance with the architecture shown in FIG. 1.
Figure 3:
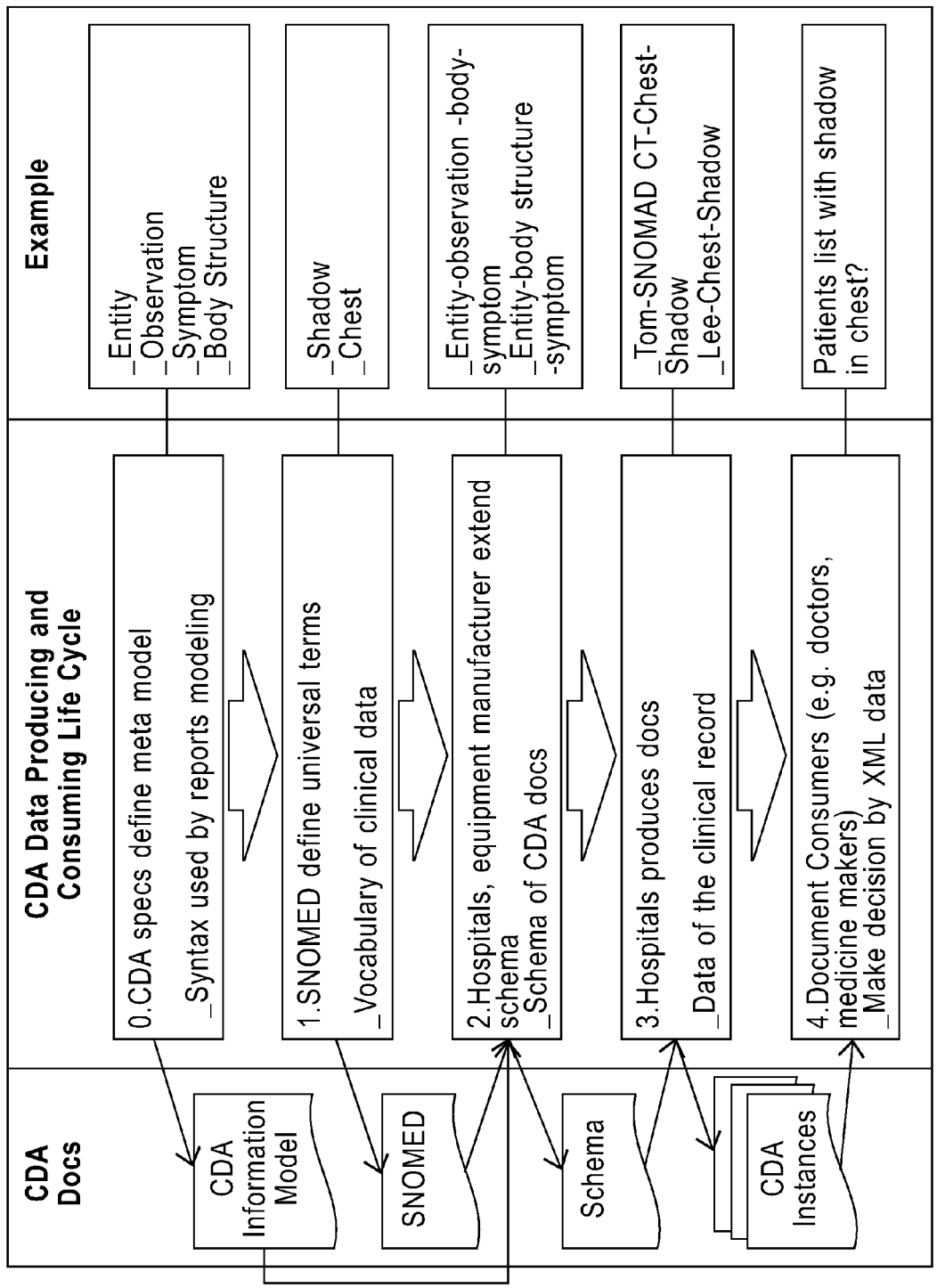
FIG. 3 shows an example of CDA in accordance with the architecture shown in FIG. 1.
Figure 4:
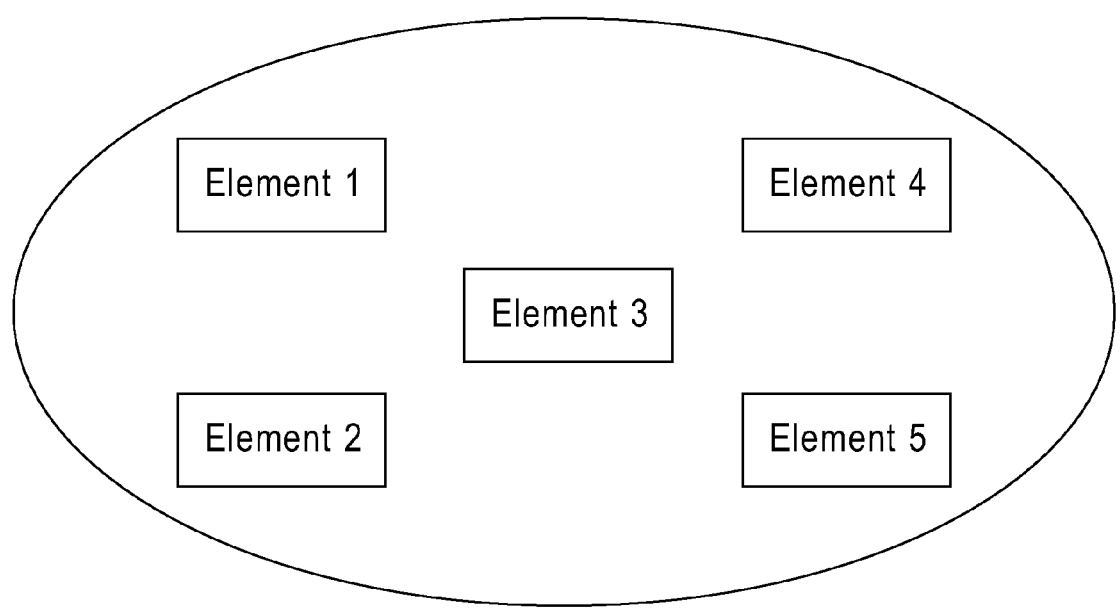
FIGS. 4 and 5 show examples of different variable schemas with common vocabularies.
Figure 5B:
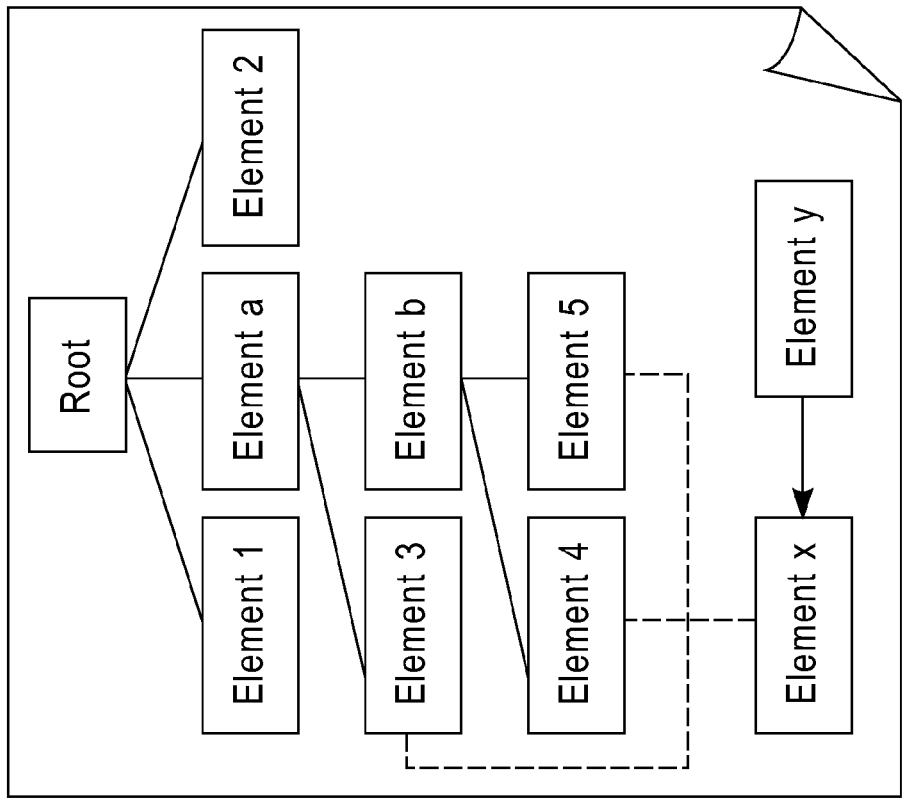
Figure 5A:
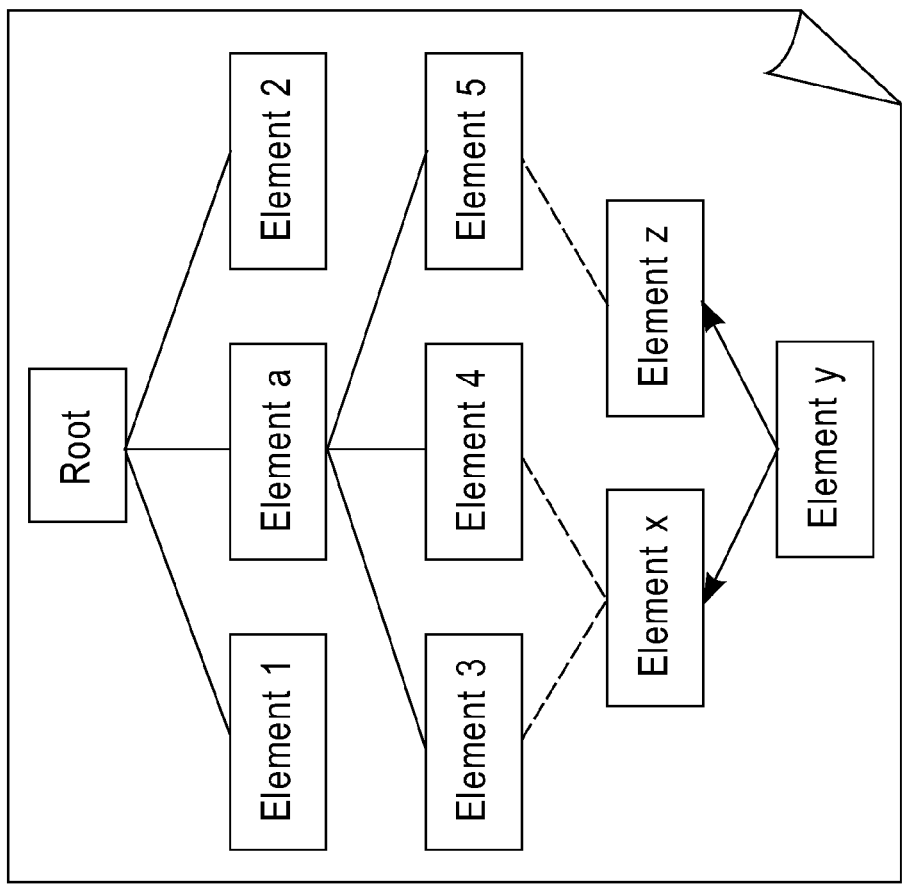
Figure 6:
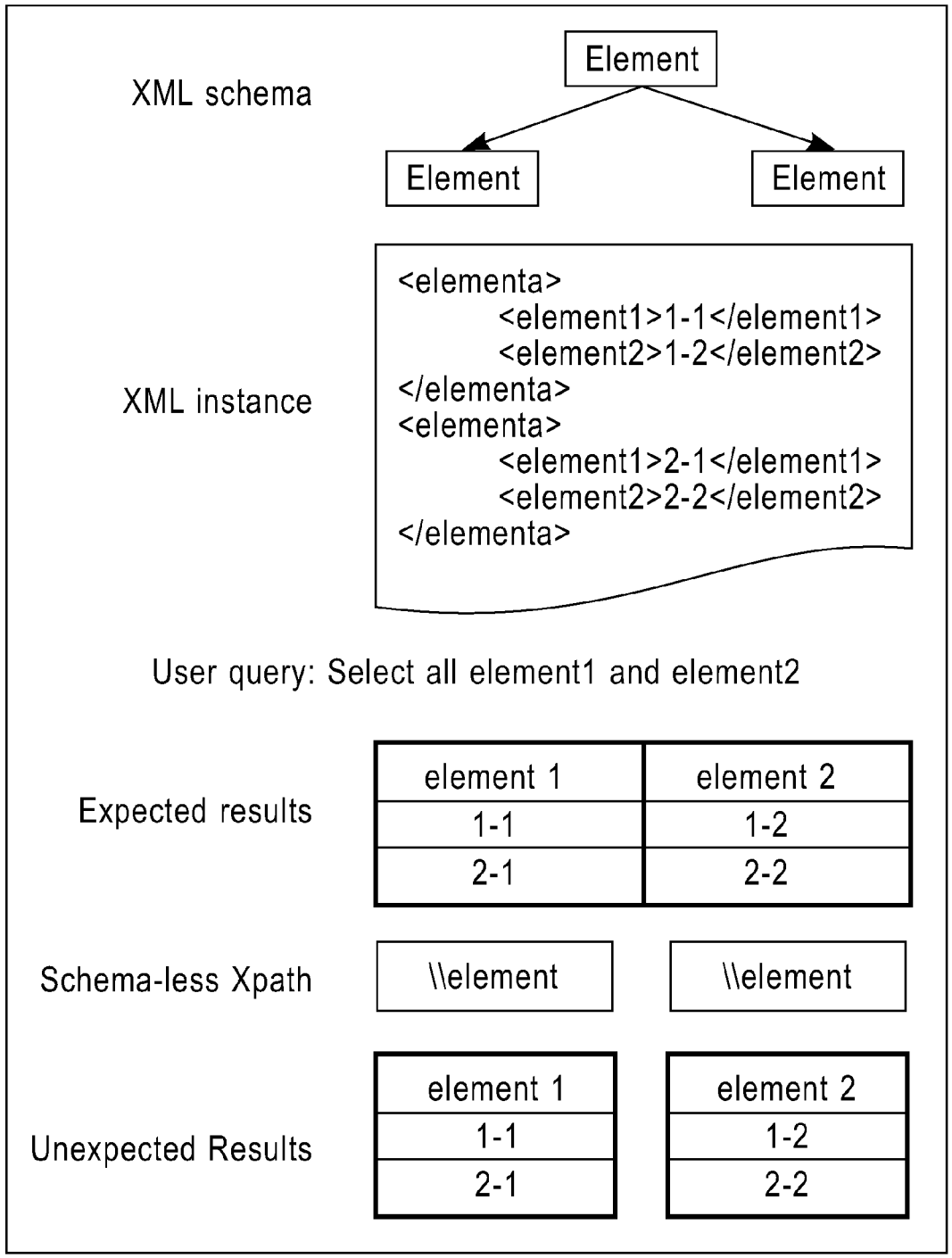
FIG. 6 shows an example of a schema-less query on XML documents in the prior art.
Figure 7:
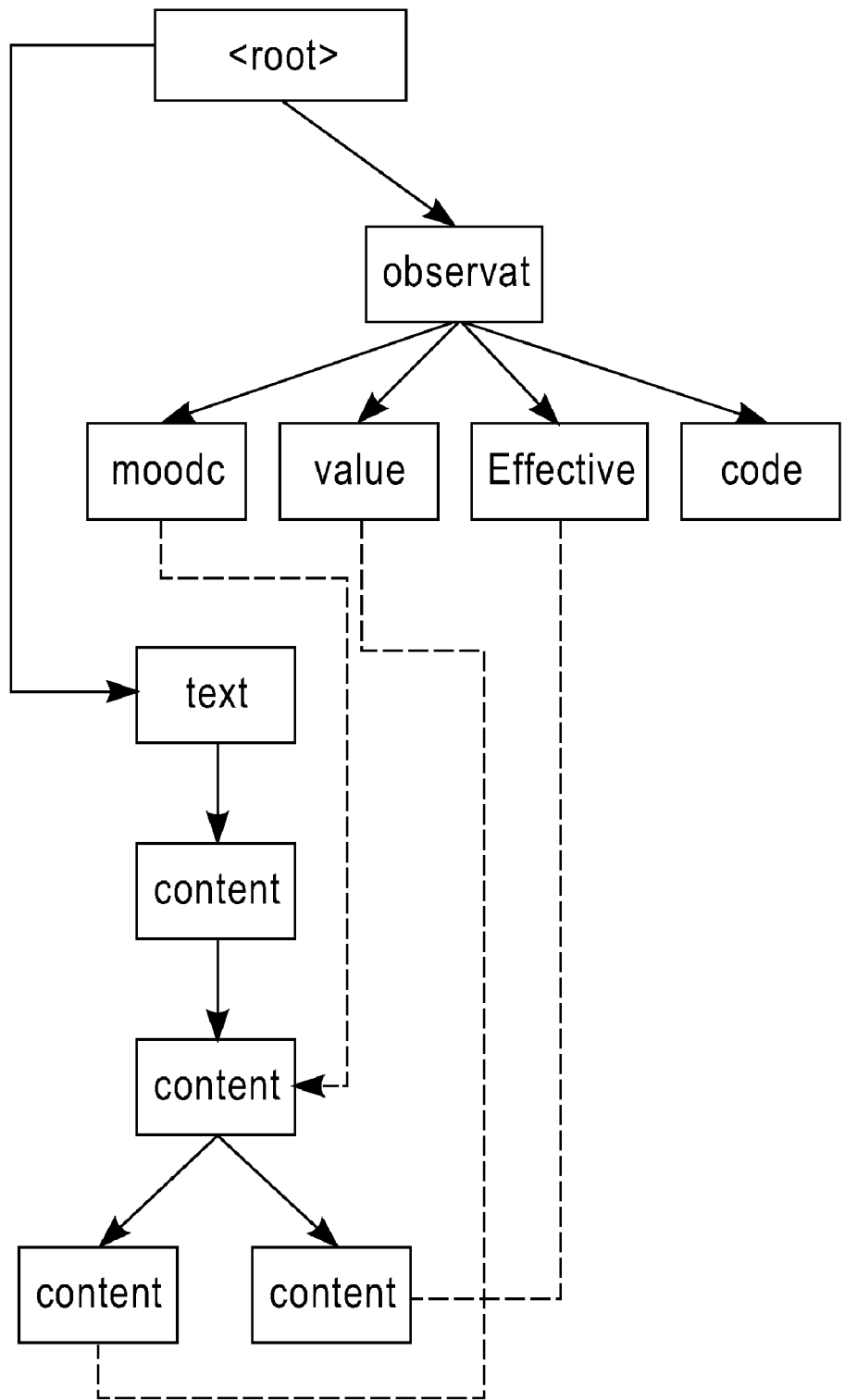
FIG. 7 shows a tree structure obtained by parsing a CDA instance document.

As shown in FIG. 7, corresponding tree structures can be obtained by parsing the above document. FIG. 7 shows two sub-trees beneath a root node, where the elements in one sub-tree have references to the elements in the other sub-tree (indicated by broken lines).

Another XBRL document used for further illustration has the following principle elements:
    context (meta data)
    entity period
segment
scenario
unit
... and more ...
body (financial data)
Balance sheet
Cash flow statement
Income statement
... and more ...

An XRRL document is defined based on the above schema and vocabularies:

```
<context contextid="context1">
    <entity>a</entity>
    <period>2005</period>
</context>
<pte:asset contextRef="context1">1000</pte:asset>
<pte:cashnotes>
    <pte:cash contextref="context1">1002</pte:cash>
    <pte:notes contextref="context1">acquire</pte:notes>
</pte:cashnotes>
```

As shown in the above document, an element with contextID tag "context 1" is defined in the portion between the labels <context> and </context>, which includes value "a" for sub element "entity" and value "2005" for sub element "period".

An element "asset" referring to the context element whose "contexID" attribute is tagged as "context 1" and is defined in the portion <pte:asset contextRef="context1">1000</pte:asset>.

An element "cashnote" and its sub nodes "cash" and "notes", which both refer to "context1", are defined in the portion between the labels <pte:cashnotes> and </pte:cashnotes>.

Figure 8:
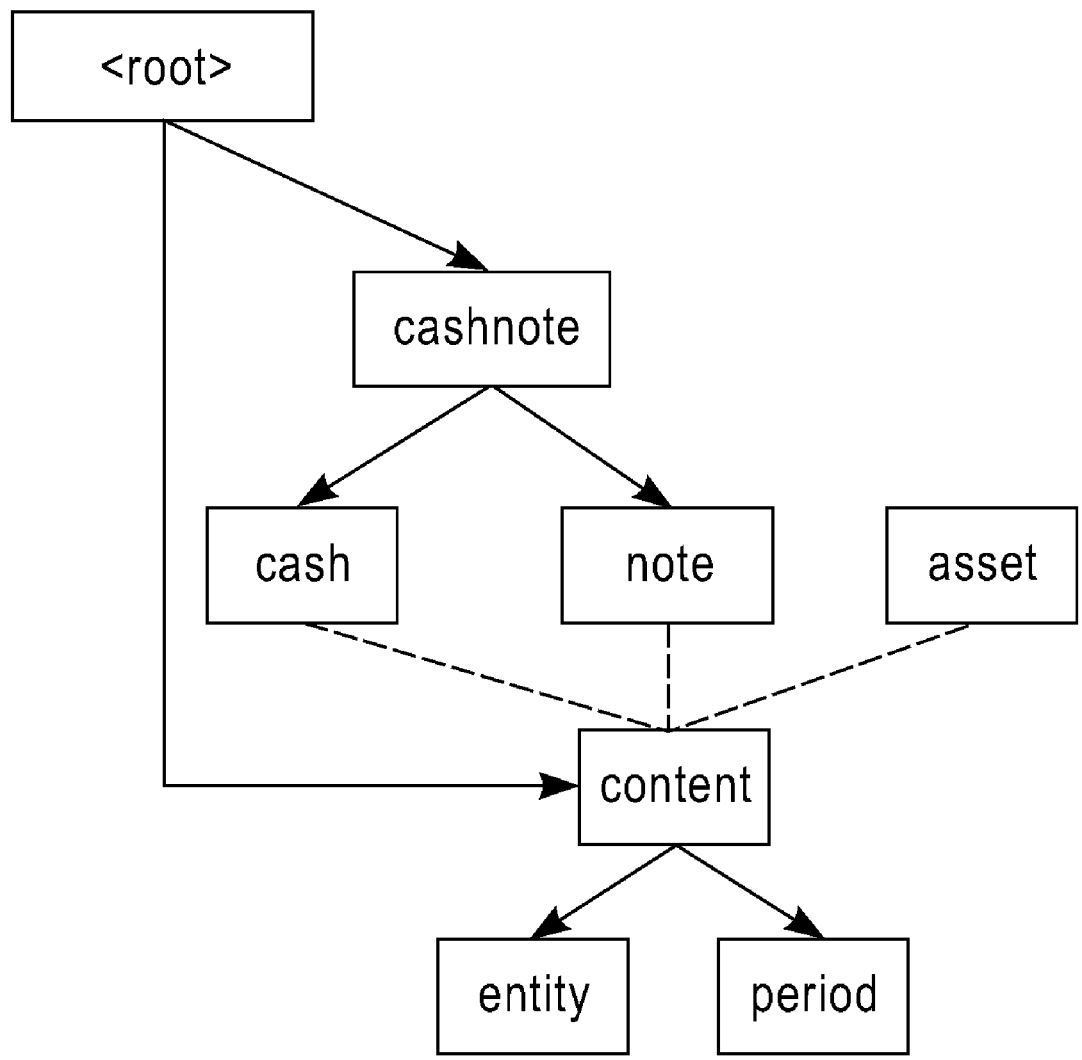
FIG. 8 shows a tree structure obtained by parsing an XBRL instance document.

As shown in FIG. 8, a corresponding tree structure can be obtained by parsing the above document. FIG. 8 shows two sub-trees beneath a root node, where the elements in one sub-tree have references to the elements of the other sub-tree (indicated by broken lines).

A CDA XML document and an XBRL XML document are introduced above. With respect to the above documents, it is quite often that one query involves connection of elements of two or more trees linked by an anchor. For example, one query for the above CDA document is {Thrombocyte, second day post-bmt}, where the "Thrombocyte" and the "second day post-bmt" correspond to the element "code" and the element "content" with ID "a2" respectively, which are located in two different sub-trees.

Figure 14:
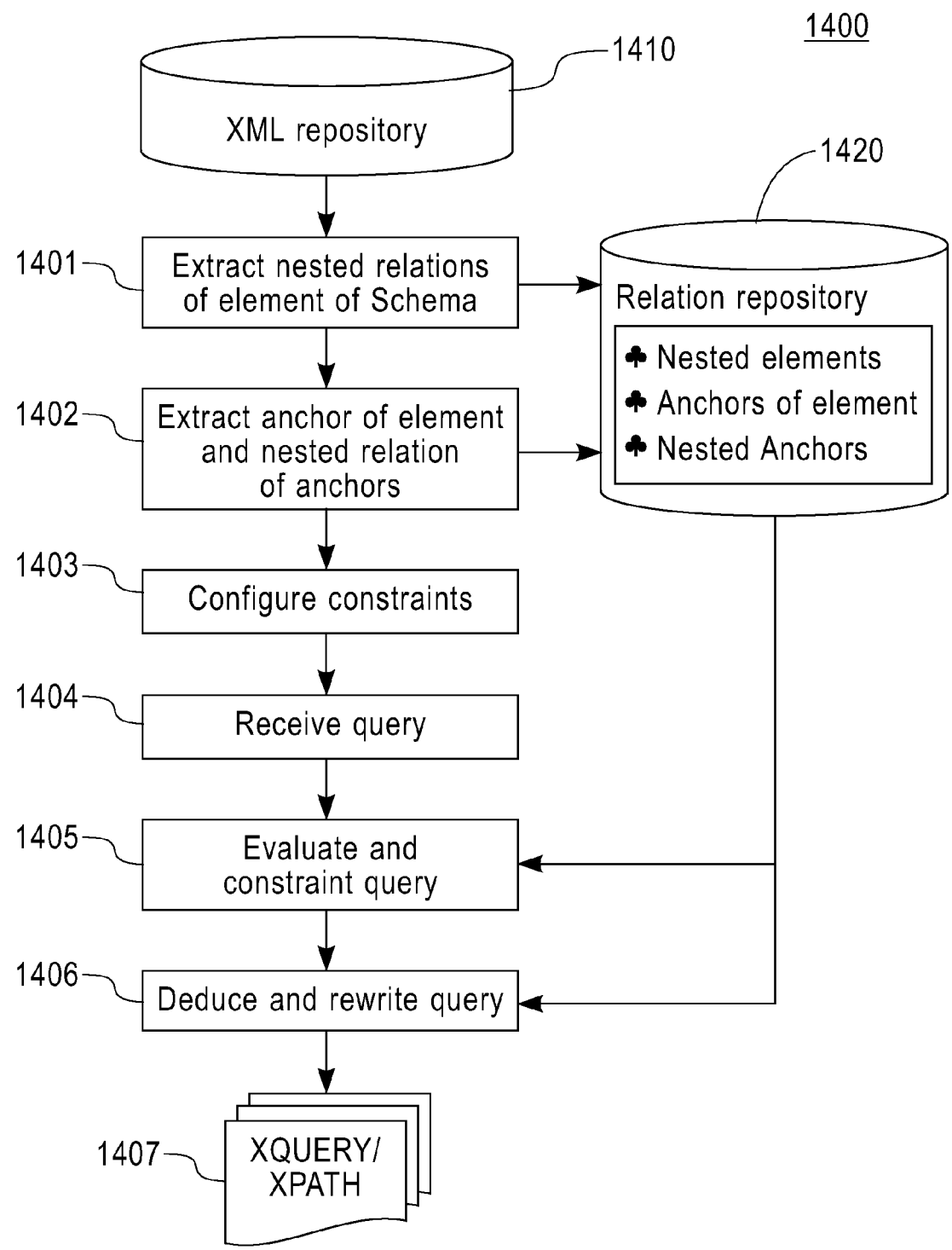
FIG. 14 shows a flowchart of the method according to an embodiment of the present invention.

Referring to FIG. 14, the invention provides a method for generation an XQuery/XPath query to common syntax and vocabulary model based XML documents.

According to a preferred embodiment of this invention, the flowchart 1400 of the method includes steps of:
  step 1401: processing the XML schema to extract a nested relationship between the elements of the schema.
  step 1402: processing the XML document to extract a reference relationship between elements and anchors, as well as a nested relationship between the anchors, and if a logical nested relationship exists between anchors, consolidating these relationships.

Alternatively, according to another aspect of this invention, with respect to schema-less documents, the nested relationship between elements could be extracted from the document.

Additionally, both XML schemas and XML documents can come from an XML repository 1400, the XML repository 1400 can contain meta model definitions, schema definition, document instances, etc.

Step 1403: configuring constraint rules.

Step 1404: receiving a query.

Step 1405: constraining the query according to constraint rules. Specifically, the constraint rules are applied to the query based on the reference relationship between elements and anchors, as well as the nested relationship between anchors.

Step 1406: reasoning and rewriting the query. With respect to the elements being queried, inferring tree structures of these queried elements from the nested relationships obtained at step 1401, and then translating the query to an XQuery/XPath query.

Step 1407: after the XQuery/XPath is obtained for each document, processing corresponding documents with the XQuery/XPaths to get expected results.

The above process 1400 will be discussed below using a specific example of XBRL.

Step 1401: Processing the Schema to Extract a Nested Relationship Between the Elements of the Schema First, XBRL "schema 1" and "schema 2" are defined in advance (schema1.xsd and schema2.xsd).

schema1.xsd:

```
<element id="guarantee" substitutionGroup="tuple">
    <sequence>
        <element ref="guaranteeAmount"/>
        <element ref="debtor"/>
    </sequence>
</element>
<element id="debtor" substitutionGroup="tuple">
    <sequence>
        <element ref="debtorName"/>
        <element ref="contact"/>
    </sequence>
</element>
<element id="contact" substitutionGroup="tuple">
    <sequence>
        <element ref="tel"/>
        <element ref="email"/>
    </sequence>
</element>
<element id="guaranteeAmount" substitutionGroup="item">
<element id="debtorName" substitutionGroup="item">
<element id="email" substitutionGroup="item">
<element id="tel" substitutionGroup="item">
```

Figure 9:
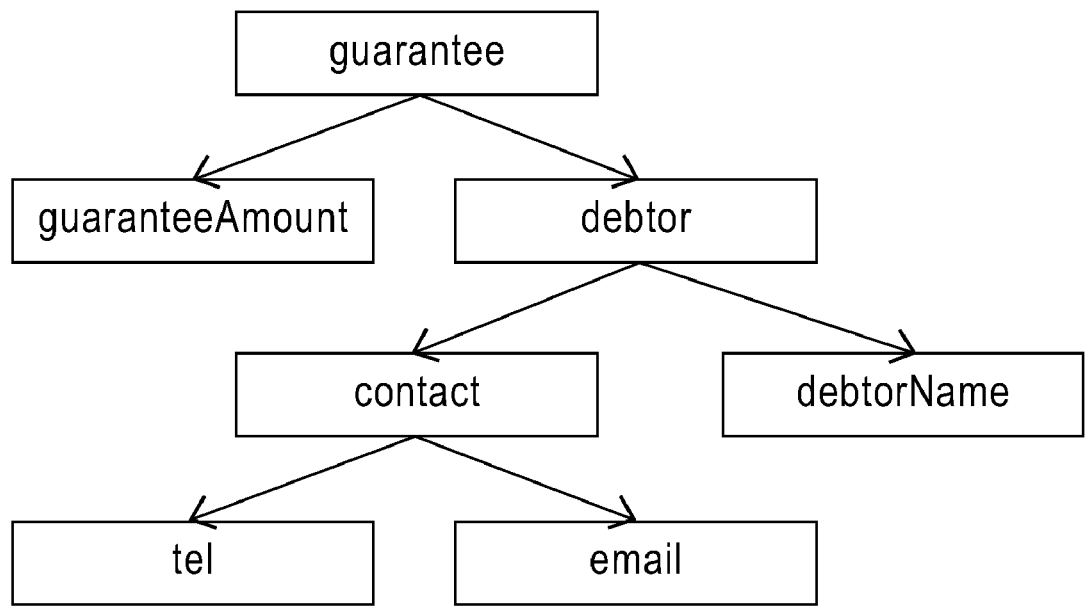
FIG. 9 shows a tree structure obtained by parsing an XML schema document A.

FIG. 9 shows a tree structure obtained by parsing the "schema 1".

Table 1 shows a nested relationship between elements extracted from "schema 1".

TABLE 1

| schema ID | Element | Sub-Element |
|---|---|---|
| Schema1.xsd | guarantee | guaranteeAmount |
| Schema1.xsd | guaranteeAmount | |
| Schema1.xsd | guarantee | Debtor |
| Schema1.xsd | debtor | Contact |
| Schema1.xsd | debtor | debtorName |
| Schema1.xsd | debtorName | |
| Schema1.xsd | contact | Tel |
| Schema1.xsd | Tel | |
| Schema1.xsd | contact | Email |
| Schema1.xsd | email | |

In Table 1, the first column "SchemaID" indicates the source, "schema1.xsd", the second column lists all elements defined in "schema1.xsd", and the third column shows sub node of each element. As shown in table 1, element "debtor" has two sub elements: "contact" and "debtorName"; element "contact" has two sub elements "tel" and "email"; elements "guaranteeAmount", "debtorName", "tel", "email" are leaf nodes and do not have any sub element further. Table 1 shows the corresponding tree of FIG. 9 in a table form.

```
schema2.xsd:

<element id="offbalance-item" substitutionGroup="tuple">
    <sequence>
        <element ref="guaranteeAmount"/>
        <element ref="debtorName"/>
        <element ref="tel"/>
        <element ref="email"/>
    </sequence>
</element>
<element id="guaranteeAmount" substitutionGroup="item">
<element id="debtorName" substitutionGroup="item">
<element id="email" substitutionGroup="item">
<element id="tel" substitutionGroup="item">
```

Figure 10:
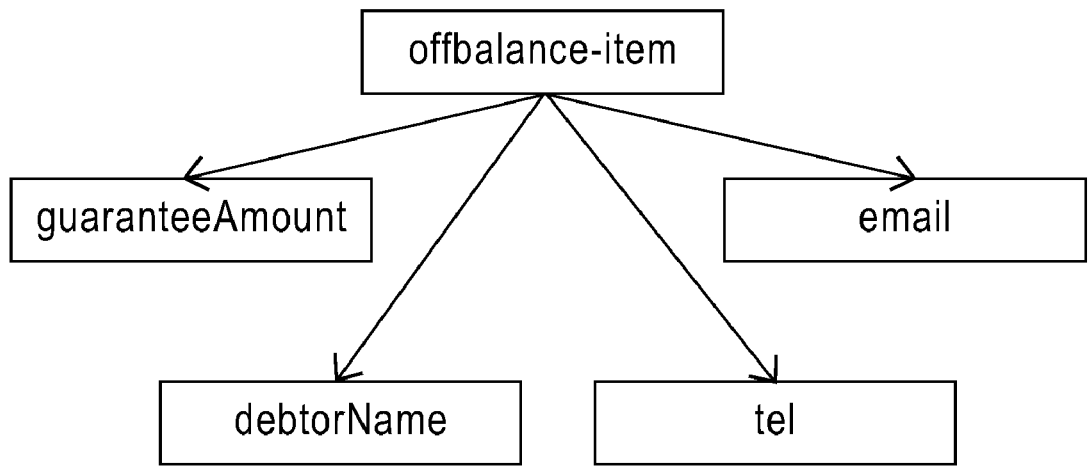
FIG. 10 shows a tree structure obtained by parsing an XML schema document B.

FIG. 10 shows a tree structure obtained by parsing the "schema 2."

Table 2 shows a nested relationship between elements extracted from the "schema 2".

TABLE 2

| SchemaID | Element | Sub-Element |
| --- | --- | --- |
| Schema2.xsd | offbalance-item | guaranteeAmount |
| Schema2.xsd | offbalance-item | debtorName |
| Schema2.xsd | offbalance-item | Tel |
| Schema2.xsd | offbalance-item | Email |
| Schema2.xsd | guaranteeAmount | |
| Schema2.xsd | debtorName | |
| Schema2.xsd | Tel | |
| Schema2.xsd | Email | |

The first column of Table 2, "SchemaID", indicates the source, "schema2.xsd", the second column lists all elements defined in "schema2.xsd", and the third column represents sub node of each element. As shown in table 2, element "offbalance-item" has four sub elements: "guaranteeAmount", "debtorName", "tel", and "Email"; elements "guaranteeAmount", "debtorName", "tel", and "Email" are leaf nodes and do not have any further sub elements. Table 2 shows the corresponding tree of FIG. 10 in a table form. As known by those skilled in the art, this invention is not limited to the above diagrams or tables of tree structure in representing the relationship. Various other data structures can also be used.

In this embodiment, Tables 1 and 2 are generated at step 1401.

Step 1402: Processing Elements of XML Document Instances

Step 1402 can include at least one of the following operations: (1) extracting anchors of elements from the instance documents; (2) extracting the reference relationship between anchors; and (3) consolidating logical relationship between the anchors.

The instances "Document1.xml" and "Document2.xml," based on "schema1.xsd" and "schema2.xsd," are defined as follows:

```
Document1.xml

<link:schemaRef xlink:type="simple" xlink:href="schema1.xsd" />
<xbrl>
<context id="c1">
    <entity>
        <identifier>a</identifier>
        <segmentation>GCG</segmentation>
    <entity>
</context>
<context id="c2">
    <entity><identifier>a</identifier></entity>
</context>
<guarantee>
    <guaranteeAmount contextRef="c1">100</GuaranteeAmount>
    <debtor>
        <debtorName contextRef="c1">jack</debtorName>
        <contact>
            <tel contextRef="c1">82899123</tel>
            <email contextRef="c1">jack@163.com</email>
        </contact>
        <contact>
            <tel contextRef="c1">82899789</tel>
            <email contextRef="c1">jack@sohu.com</email>
        </contact>
    </debtor>
</guarantee>
<guarantee>
    <guaranteeAmount contextRef="c2">200</guaranteeAmount>
    <debtor>
        <debtorName contextRef="c2">tom</debtorName>
        <contact>
            <tel contextRef="c2">82899456</tel>
            <email contextRef="c2">tom@sohu.com</email>
        </contact>
    </debtor>
</guarantee>
</xbrl>
```

The first line of "Document1.xml" declares a link to the "schema1.xsd", and then two instances of "context" element, context "c1" and context "c2", are defined. Context "c1" has a sub element "entity", and the element "entity" has a sub element "Identifier" whose value is "a" and a sub element "segmentation" whose value is "GCG". Context "c2" has a sub element "entity", which has a sub element "Identifier" whose value is "a". "Document1.xml" further defines two instances of "guarantee" element relating to sub element "Debtor" whose "debtorName" is "jack" and "tom" respectively.

Figure 11:
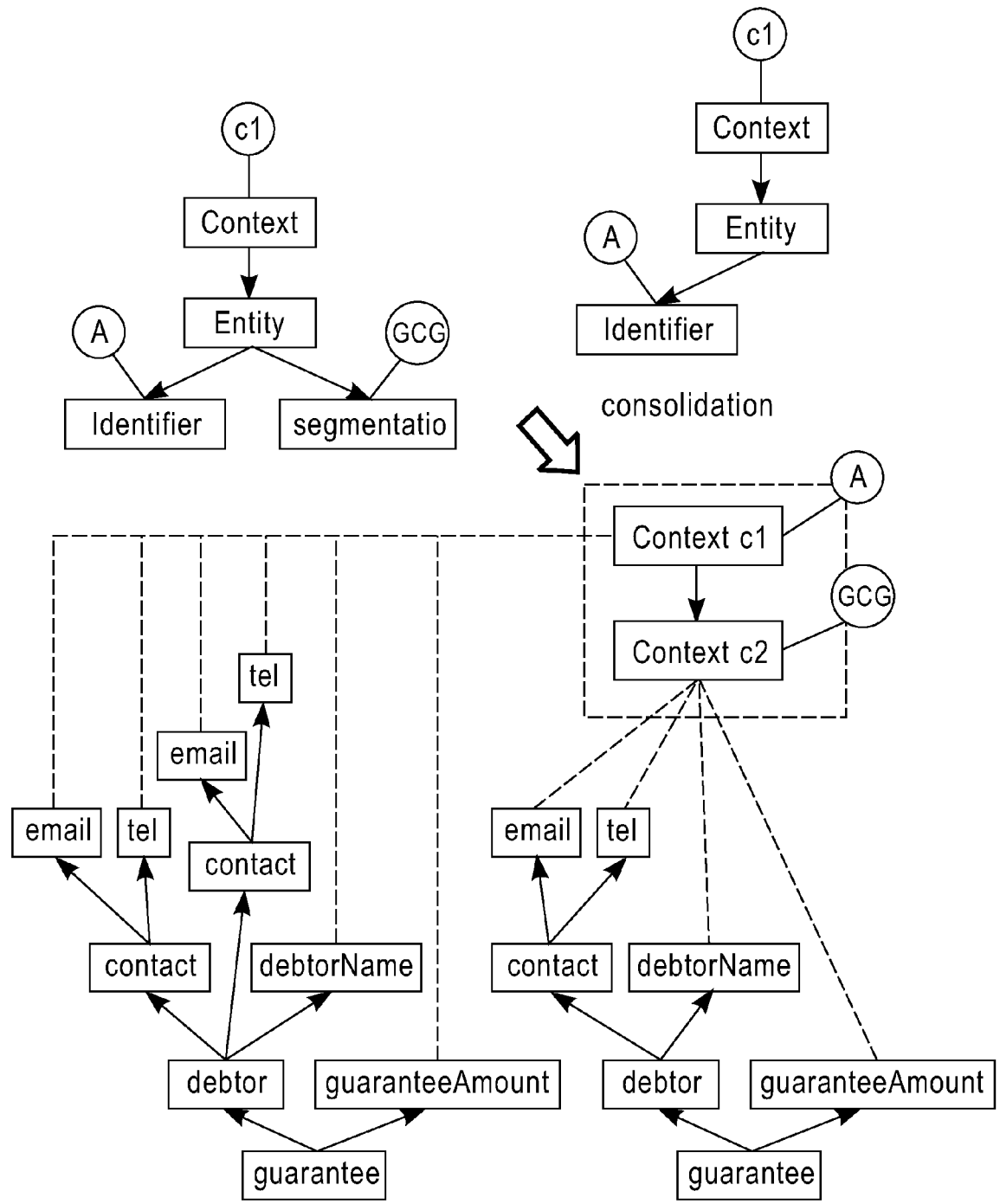
FIG. 11 shows a tree structure obtained by parsing XBRL instance "document 1", which is based on "schema 1"

FIG. 11 shows two instances of "context" element, "c1" and "c2", obtained by parsing "Document1.xml" in the top, and shows the tree structures of the two instances of "guarantee" element at the bottom. FIG. 11 also shows the nested relationship and reference relationship between the tree elements. All sub elements of the "guarantee" on the left of FIG. 11 refer to one anchor, instance of "context" element "c1", and all sub elements of the "guarantee" on the right of FIG. 11 refer to another anchor, instance of "context" element "c2".

From the tree structures of FIG. 11, the relationship between each element and its associated anchor (i.e., "context" "c1" and "c2") can be obtained. Moreover, the nested relationship between the anchors ("context" "c1" and "c2",), if any, can also be obtained.

According to the definitions of "context" "c1" and "c2" in "Document1.xml", the tree structure of "context" "c2" contains the tree structure of "context" "c1". Therefore, "context" "c1" can be treated as a logical sub node of "context" "c2". Table 3 shows the relationship between "context" "c1" and "c2".

TABLE 3

| DocumentID | Anchor | Sub-Anchor |
|---|---|---|
| Document1.xml | c2 | c1 |

A consolidation process can be carried out to build relationship between "context" "c1" and "c2". As an example, but not a limitation, the following process is adopted to consolidate relationship between the anchors for XBRL documents:

```
Input c1, c2
    -if c1.identifier=c2.identifier then
        If (c1.segmentation==c2.segmentation)
            - Then output(c1 equals c2) return
        If (c1.segmentation!=null) and (c2.sementation==null)
            - Then output(c1 is part of c2) return
        If (c1.segmentation==null) and (c2.segmentation!=null)
    - Then output (c2 is part of c1) return
```

In the above process, first, the value of element "identifier" of "c1" and "c2" are compared. If the values of two "identifier" elements are identical, the "segmentation" values are compared. If the two "segmentation" values are also identical, c1 is an equivalent of c2. Otherwise, if one "segmentation" is Null, and the other is not Null, a nested relationship exists therebetween. Table 4 shows the anchors referred by each element.

TABLE 4

| DocumentID | Element | Element-Anchor |
|---|---|---|
| Document1.xml | Tel | c1, c2 |
| Document1.xml | Email | c1, c2 |
| Document1.xml | debtorName | c1, c2 |
| Document1.xml | guaranteeAmount | c1, c2 |

The "Guarantee" element includes sub elements "tel", "email", "debtorName" and "guaranteeAmount". As shown in FIG. 11, these sub elements refer to "context" "c1" in one instance of "Guarantee" element, and refer to "context" "c2" in the other instance of "Guarantee" element. Therefore, each sub element refers to either "c1" or "c2".

A document "document2.xml" based on "schema2.xsd" is given as follows:

```
Document2.xml

<link:schemaRef xlink:type="simple" xlink:href="schema2.xsd" />
<xbrl>
<context id="c1">
    <entity>
        <identifier>a</identifier>
        <segmentation>GCG</segmentation>
    <entity>
</context>
<context id="c2">
    <entity><identifier>a</identifier></entity>
</context>
<offbalance-item>
    <guaranteeAmount contextRef="c1">700</GuaranteeAmount>
    <debtorName contextRef="c1">john</debtorName>
    <tel contextRef="c1">55588123</tel>
    <email contextRef="c1">john@163.com</email>
</offbalance-item>
<offbalance-item>
    <guaranteeAmount contextRef="c2">600</guaranteeAmount>
    <debtorName contextRef="c2">marry</debtorName>
```

```
Document2.xml

<tel contextRef="c1">55588456</tel>
    <email contextRef="c1">marry@sohu.com</email>
</offbalance-item>
</xbrl>
```

The first line of "Document2.xml" declares a link to "schema2.xsd", and then two instances of "context" element: "context" "c1" and "c2" are defined. "Context" "c1" has a sub element "entity", which has a sub element "Identifier" "a" and a sub element "segmentation" "GCG". "Context" "c2" has a sub element "entity", which has a sub element "Identifier" "a". The "Document2.xml" further defines two instances of "offbalance-item" relating to sub elements "Debtor" whose "DebtorName" is "john" and "marry" respectively.

Figure 12:
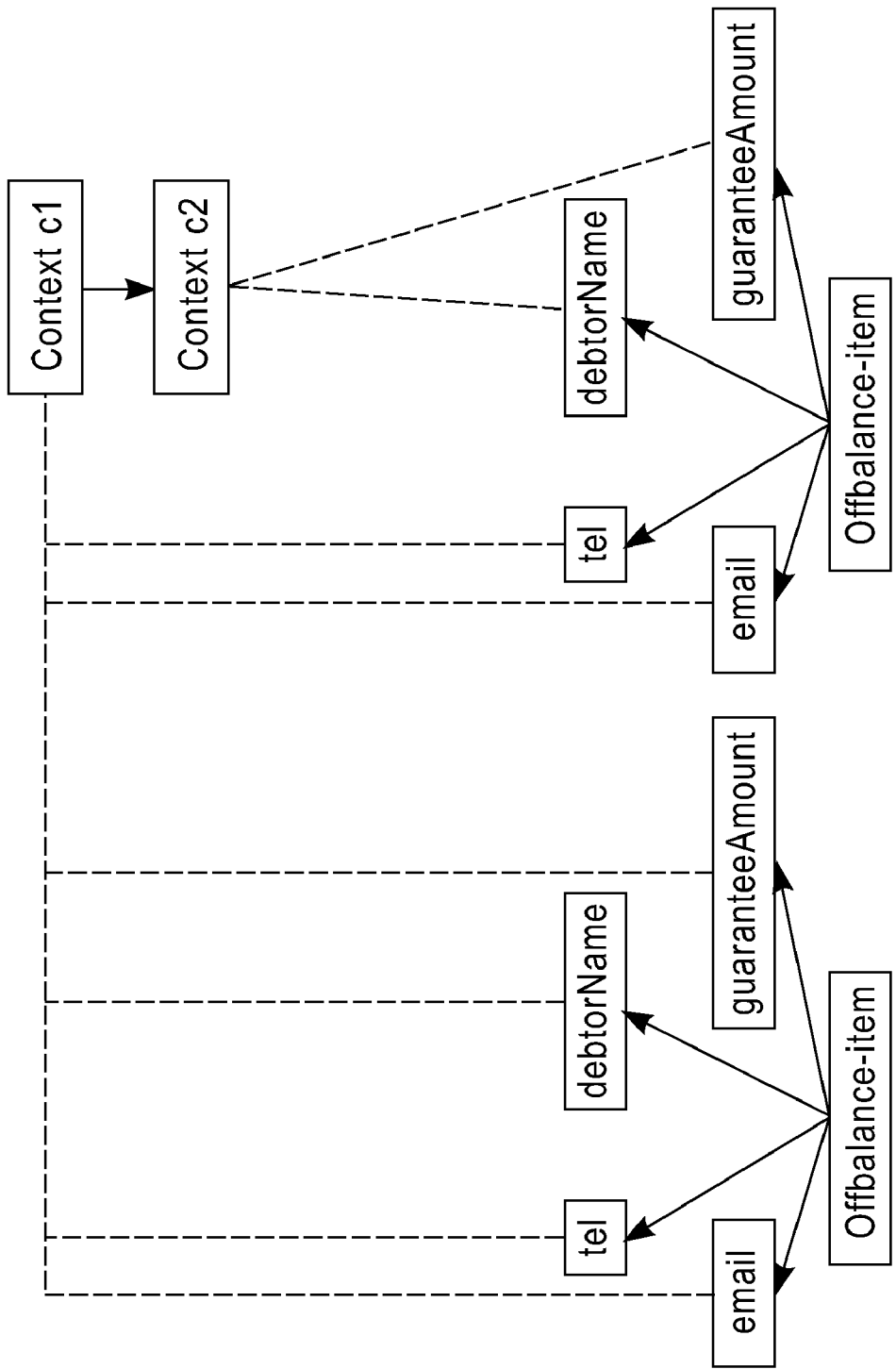
FIG. 12 shows a tree structure obtained by parsing XBRL instance "document 2", which is based on "schema 2"

FIG. 12 shows two contexts "c1" and "c2", two tree structures of two instances of element "guarantee", and the relationship between the tree elements, obtained by parsing "Document2.xml". All sub elements of one instance of "offbalance-item" on the left of FIG. 12 refer to one anchor "context" "c1", and all sub elements of the other instance of "offbalance-item" element on the right of FIG. 12 refer to another anchor "context" "c2".

From the tree structures of FIG. 12, the relationship between each element and its associated anchor can be obtained, as well as the nested relationship between the anchors, if any.

According to the definitions of "context" "c1" and "context" "c2" in "Document2.xml", the tree structure of "context" "c2" contains the tree structure of "context" "c1", thus "context" "c1" can be treated as a logical sub node of "context" "c2".

Table 5 shows the relationship between "context" "c1" and "context" "c2".

TABLE 5

| DocumentID | Anchor | Anchor-Part |
|---|---|---|
| Document2.xml | c2 | c1 |

The above process actually is a consolidation of the relationship between instances of "context" elements "c1" and "c2".

Table 6 shows the anchors referred by each element of "offbalance-item".

TABLE 6

| DocumentID | Element | Element-Anchor |
|---|---|---|
| Document2.xml | Tel | c1 |
| Document2.xml | Email | c1 |
| Document2.xml | debtorName | c1, c2 |
| Document2.xml | guaranteeAmount | c1, c2 |

The node "offbalance-item includes sub elements "tel", "email", "debtorName" and "guaranteeAmount". As shown in FIG. 12, the sub elements "tel", "email" refer to "context" "c1" in each instance, and the elements "debtorName" and "guaranteeAmount" refer to "context" "c1" in one instance (on the left of FIG. 12), and refer to "context" "c2" in another instance (on the right of FIG. 12). Thus elements "debtorName" and "guaranteeAmount" refer to either "c1" or "c2".

The above documents "Document1.xml" and "Document2.xml" are based on "schema1.xsd" and "schema2.xsd". As to schema-less documents, the relationship between the elements can be obtained from the instance documents directly. In other words, the nested relationship between the elements shown in tables 1 and 2 can also be obtained by parsing "Document1.xml" and "Document2.xml" directly.

At step 1402, the anchors to which the elements refer (as shown in tables 4 and 6) and the relationship therebetween (as shown in tables 3 and 5) are extracted.

Step 1403: Configuring Constraint Rules

According to one aspect of this invention, users can define the following query constraints in advance:

Assume that the queried objects are elements X and Y.

Constraint rule 1: to search a minimum spanning tree containing X, Y, . . . in the XML elements tree.

In fact, rule 1 does not apply any constraint to the anchors referred by elements X, Y.

Constraint rule 2: to apply constraint rule 1 and that anchors associated with elements X, Y, . . . are limited to anchors of a same tree in CDA.

Referring to FIG. 11, "context" "c1" and "context" "c2" have a super-sub relationship therebetween and belong to one same anchor tree. Therefore, searching could be conducted in the whole tree structure shown in FIG. 11. Likewise, as shown in FIG. 12, "context" "c1" and "context" "c2" have a super-sub relationship therebetween and belong to one same tree. Therefore, searching could be conducted in the whole tree structure shown in FIG. 12. The following judgments are considered in order to determine whether the contexts of X, Y, . . . belong to a same element tree and refer to anchors on the same anchor tree:

X is a CDA element
Y is a CDA element
X and Y have same ancestor
M is a CDA anchor
N is a CDA anchor
M and N have same ancestor
X refer To M
Y refer To N Constraint rule 3: to apply constraint rule 1 and that anchors associated with X, Y, . . . are limited to one same anchor in the XBRL.

If the constraint rule 3 is adopted, the second instance of "Offbalance-item" element defined in the "document 2" is filtered out by this constraint, because the sub elements "tel", "email" in the second "Offbalance-item" refer to "context" "c1", but the sub elements "debtorName", "guaranteeAmount" refer to "context" "c2", and "context" "c1" and "context" "c2" are not a same anchor. Assume X is "tel" and Y is "debtorName", then X refers to "context" "c1" and Y refers to "context" "c2", and the anchors associated with X and Y are not a same anchor. Therefore, according to the constraint rule 3, searching in the second "Offbalance-item" is omitted.

Further, as those skilled in the art can understand, other constraint rules can be defined based on user requirements, and any combination thereof is also possible. For example, other examples of constraint configuration can include:

Constraint rule 4: constraint rule 2 and that at least one anchor associated with X and Y is a leaf node of the anchor tree.

Constraint rule 5: constraint rule 1 and that the anchors associated with X and Y are limited to a same anchor tree, and both of X and Y are leaf nodes of elements tree.

Based on the predefined constraint rule said above, the query inputted by user can be evaluated and filtered.

Step 1404: Receiving a Query

In this embodiment, the received query is a query to XBRL documents, for example "{guaranteeAmount, debtorName, tel}", which queries three elements at the same time. The evaluation of the constraint or query "{guaranteeAmount, debtorName, tel}" will be described.

According to one preferred embodiment of this invention, the query is evaluated based on the constraint rules defined at step 1403.

In other alternative embodiments of this invention, it is possible that none of the constraint rules is applied to a query. Other possible implementations can include, for example, skipping step 1403 and the following step 1405.

Step 1405: Evaluating and Constraining the Query

At step 1405, the query is evaluated based on the predefined constraint rules, which can be configured by users. Step 1405 is an optional step for normalizing the semantic constraints of the query. Because of the lack of a unique schema, the documents relating to the query can have diverse or even various schemas. The user probably only need documents meeting certain requirements, thus step 1405 is used to provide user with a further selection.

First, the anchors referred to by the queried elements are obtained based on "document1.xml" and "document2.xml".

Referring to FIG. 11, "document1" includes two sub trees, one of which refers to "context" "c1", and the other refers to "context" "c2". Each of the sub trees includes the elements "guaranteeAmount", "debtorName" and "tel". In "document 1", the queried elements "guaranteeAmount", "debtorName" and "tel" refer to not only "context" "c1" but also "context" "c2", the reference relationship therebetween can be represented as:

Document1_1: (guaranteeAmount, c1), (debtorName, c1), (tel, c1)
Document1_2: (guaranteeAmount, c2), (debtorName, c2), (tel, c2)

Thus, the contexts referred to by elements "guaranteeAmount", "debtorName" and "tel" are either "c1" or "c2", and can be represented as:

Document1: (guaranteeAmount, c1, c2), (debtorName, c1, c2), (tel, c1, c2)

Referring to FIG. 12, "document2.xml" contains two sub trees, one of which refers to "context" "c1", and the other refers to either contexts "c1" or "c2". The queried elements "guaranteeAmount", "debtorName" and "tel" refer to "context" "c1" in one sub tree, and refer to either "context" "c1" or "context" "c2" in the other sub tree. The reference relationship between elements "guaranteeAmount", "debtorName" and "tel" and "context" "c1", "context" "c2" can be represented as:

document2_1: (guaranteeAmount, c1), (debtorName, c1), (tel, c1)
document2_2: (guaranteeAmount, c2), (debtorName, c2), (tel, c1)

Thus, the anchors referred to by elements "guaranteeAmount", "debtorName" are "c1" or "c2", and the anchor referred to by element "tel" is "c1"=can be represented as:

document2: (guaranteeAmount c1, c2), (debtorName, c1, c2), (tel, c1)

Next, the query is constrained according to the constraint rules configured at step 1403.

According to one aspect of this invention, constraint rule 2 configured at step 1403 is adopted, that is, the anchors associated with elements "guaranteeAmount", "debtorName" and "tel" are limited to anchors of a same anchor tree in CDA. Because "context" "c1" and "context" "c2" of "document1.xml" and "document2.xml" belong to the same tree (see Tables 3 and 5), the anchors to which the elements "guaranteeAmount", "debtorName" and "tel" refer to, thus belong to the same tree. Therefore, no element is filtered out by constraint rule 2.

Applying constraint rule 2 to "Document 1", we can obtain:

Document1: (guaranteeAmount, c1, c2), (debtorName, c1, c2), (tel, c1, c2)

Applying constraint rule 2 to "document 2", we can obtain:

document2: (guaranteeAmount c1, c2), (debtorName, c1, c2), (tel, c1)

It can be seen that applying constraint rule 2 to "Document 1" will yields the same result.

According to another aspect of the present invention, constraint rule 3 is adopted, that is, the anchors to which the elements "guaranteeAmount", "debtorName" and "tel" refer to are limited to the same anchor in the XBRL. Thus, because element "tel" in the second "Offbalance-item" defined in "document 2" refers to "context" "c1", and the elements "guaranteeAmount", "debtorName" refer to the different "context" "c2", the search for the second "Offbalance-item" is filtered out according to constraint rule 3 as follows:

applying the constraint rule 3 to the "document 1", we get:

document1: (guaranteeAmount, c1, c2), (debtorName, c1, c2), (tel, c1, c2)

applying the constraint rule 3 to the above "document 2", we get:

document2: (guaranteeAmount, c1), (debtorName, c1), (tel, c1)

Thus, when constraint rule 3 is adopted, the anchor referred to by "document2.xml" is limited to "c1".

As described above, the result of step 1405 is:

The anchor constraints produced by applying the constraint rule 2 are null:

document1: (guaranteeAmount ( )), (debtorName, ( )), (tel, ( ))

document2: (guaranteeAmount ( )), (debtorName, ( )), (tel, ( ))

The anchor constraints produced by applying the constraint rule 3 are Not null:

document1: (guaranteeAmount ( )), (debtorName, ( )), (tel, ( ))

document2: (guaranteeAmount c1), (debtorName, ( )), (tel ( ))

Step 1406: Reasoning and Rewriting the Query

First, a reasoning step is made to the queried elements based on the relationship repository 1420 in order to generate the corresponding tree structures. The tables 1 and 2 are created based on the predefined "schema 1" and "schema 2". The relationship between the queried elements "guaranteeAmount", "debtorName" and "tel" is inferred from top to bottom, and the tree structure of the elements "guaranteeAmount", "debtorName" and "tel" are reconstructed as shown in FIG. 13.

As to "schema 1", the element "guarantee" is determined as a root node by searching Table 1. As to the element "guaranteeAmount", by searching Table 1, it can be known that the root node "guarantee" is its parent. As to the element "debtorName", its parent node is "debtor", and the parent of "debtor" is the root node "guarantee". As to the element "tel", "contact" is its parent, "debtor" is the parent of "contact", and the root node "guarantee" is the parent of "debtor". By this reasoning, a tree structure shown in FIG. 13(*a*) can be obtained. Other elements not being queried, such as element "email", are not shown. In the tree structure shown in FIG. 13(*a*), all the leaf nodes are elements being queried by user.

The tree structure in FIG. 13(*a*) also can be represented as:

document1: (guarantee, (guaranteeAmount( ), debtor (debtorName( ), contact(tel( )))))

As to "schema 2", by searching Table 2, it can be known that "offbalance-item" is the root node. As to the element "guaranteeAmount", by searching Table 2, it can be known that its parent note is the root node "offbalance-item". As to the element "debtorName", its parent is root node "offbalance-item". As to the element "tel", its parent is root node "offbalance-item". By this reasoning, a tree structure shown in FIG. 13(*b*) can be obtained. In the tree structure shown in FIG. 13(*b*), all the leaf nodes are elements being queried by the user.

The tree structure in FIG. 13(*b*) also can be represented as:

document2: (guarantee, (guaranteeAmount( ), debtorName( ), tel( )))

Thereafter, query is rewritten based on the deduced tree structure of the queried elements "guaranteeAmount", "debtorName", "tel". As shown in FIGS. 13(*a*) and 13(*b*), the leaf nodes of the tree structure are the queried elements "guaranteeAmount", "debtorName", "tel".

FIG. 14 illustrates a method for extracting a tree structure of the elements being queried by step 1401 (processing XML schemas to extract the nested relationship between elements in the schemas) and step 1402 (processing elements in the XML document instances). However, it is a merely demonstration and not a limitation to the invention. The above tree structure can be extracted in other ways based on the technical teachings of this description. For example, the root node can be extracted from the XML documents using known tools or programming libraries for parsing XML documents, such as Simple API for XML (SAX), Extensible Stylesheet Language Transformations (XSLT), Document Object Model (DOM), etc, and a tree structure can be determined by extracting sub nodes of the tree one by one. These extracting methods are well known for those XML software developers.

Various modifications can be made to the method shown in FIG. 14 based on the enlightenment of this description. One example is as follows:

a query receiving step for receiving a query;

a tree structure generating step for generating tree structures to which the elements contained in the inputted query refer, of each of the one or more XML documents; and a query rewriting step for generating an XQuery/XPath for each of the one or more XML documents based on the tree structures and configurable constraint rules.

According to another embodiment of this invention, the query "{guaranteeAmount, debtorName, tel}" inputted by the user is converted into an output of all the leaf nodes of FIGS. 13(*a*) and 13(*b*). In the preferred embodiment of this invention, a recursive algorithm is adopted in the rewriting process, and the following example adopts a width-search algorithm. Other algorithms/methods, i.e., other tree structure traversing algorithms can be used to achieve the same purpose. The rewriting process includes steps:

---

1) initiate a global leaf node list, call rewriting process with the root node as an input
2) rewrite process
    2.1) if the input node is the root note, output XQuery to locate the node
    2.2) test all sub nodes of the input node
        2.2.1) initiate a local container node (non-leaf nodes) list
        2.2.2) if the sub node is a leaf node, output an XQuery to define a variable capture its value with constraint, add the variable -continued into the global leaf node list;
    2.2.3) if leaf node is container node, output an XQuery to locate the note, add the variable into the container node list;
  2.3) if the container list is empty, output an XQuery to select all the variables according to the global leaf node list;
  2.4) otherwise, for each node x in the container list, call the rewrite process with the node x as input.

The rewrite process program codes can be represented as:

Rewrite query (top-down based on elements tree)
0. Initiate a global leaf nodes list, call rewrite process with root node as input
1. rewrite process (breadth first search)
  1.1 If input node is root node, 1 output XQuery headers, 2 output XQuery to locate to the node
  1.2 Initiate a local container nodes list
  1.3 Test all child nodes of the input node
    1.3.1 if a child is a leaf node, 1 output an XQuery to define a variable capture it's value with anchor constraint, 2 add the variable into leaf nodes list
    1.3.2 If a child is a container node,1 output an XQuery for each statement to locate to the node, 2 add the nodes into container list
  1.4 If container list is null, 1 output XQuery to select all variables according to leaf nodes list
Else for x each node in container list, call rewrite process with node x as input
  1.5 If input node is root node, output XQuery footers Through the above rewrite process, the query {guaranteeAmount, debtorName, tel} inputted by the user is converted into an output of the corresponding XQuery/XPath.

The anchor constraint by applying constraint rule 2 is null, that is:

document1: (guaranteeAmount ( ), (debtorName, ( )), (tel, ( ))

document2: (guaranteeAmount ( ), (debtorName, ( )), (tel, ( )),

The XQuery/XPath outputted from the query rewriting process is:

For document1.xml
```
<xsl:stylesheet version = '1.0'
xmlns:xsl='http://www.w3.org/1999/XSL/Transform'>
<xsl:template match="/">
<xsl:for-each select="\xbrl\guarantee">
<xsl:variable name="gamount"><xsl:value-of select="guaranteeAmount"/>
</xsl:variable>
<xsl:for-each select="debtor">
    <xsl:variable name="dname"><xsl:value-of select="debtorName"/>
    </xsl:variable>
        <xsl:for-each select="contact">
            <guaranteeAmount><xsl:value-of select="$gamount"/></guaranteeAmount>
            <debtorName><xsl:value-of select="$dname"/></debtorName>
            <tel><xsl:value-of select="tel"></tel>
        </xsl:for-each>
</xsl:for-each>
</xsl:for-each>
</xsl:template></xsl:stylesheet>
For document2.xml
<xsl:stylesheet version = '1.0'
xmlns:xsl='http://www.w3.org/1999/XSL/Transform'>
<xsl:template match="/">
<xsl:for-each select="\xbrl\offbalance-item">
    <guaranteeAmount><xsl:value-of select="guaranteeAmount"/></guaranteeAmount>
    <debtorName><xsl:value-of select="debtorName"/></debtorName>
    <tel><xsl:value-of select="tel"/><tel>
</xsl:for-each>
</xsl:template></xsl:stylesheet>
```

When the constraint rule 3 is applied, the anchor constraint on "document 2" is not null, that is:

document1: (guaranteeAmount ( ), (debtorName, ( )), (tel, ( ))

document2: (guaranteeAmount c1), (debtorName, ( )), (tel, ( ))

Therefore, for "document 2", the above constraint rule 3 is reflected in the XQuery/XPath outputted form the query rewriting process as follows:

For document2.xml
```
<xsl:stylesheet version = '1.0'
xmlns:xsl='http://www.w3.org/1999/XSL/Transform'>
<xsl:template match="/">
<xsl:for-each select="\xbrl\offbalance-item">
    <guaranteeAmount><xsl:value-of select="guaranteeAmount" where contextRef= "context1"/></guaranteeAmount>
    <debtorName><xsl:value-of select="debtorName"/></debtorName>
    <tel><xsl:value-of select="tel"/><tel>
</xsl:for-each>
</xsl:template></xsl:stylesheet>
```

At step 1407, the XQuery/XPath generated at step 1406 is used to query "document1" and "document2", and expected query results can be obtained.

When the constraint rule 2 is applied, the query results are:

| Document1.xml | | |
|---|---|---|
| 100 | jack | 82899123 |
| 100 | jack | 82899789 |
| 200 | tom | 82899456 |
| Document2.xml | | |
| 700 | john | 55588123 |
| 600 | marry | 55588456 |

When the constraint rule 3 is applied, the query results are:

| Document1.xml | | |
|---|---|---|
| 100 | jack | 82899123 |
| 100 | jack | 82899789 |
| 200 | tom | 82899456 |
| Document2.xml | | |
| 700 | john | 55588123 |

Because the queried elements "{guaranteeAmount, debtorName, tel}" are limited to one same anchor by the constraint rule 3, the data relating to element "marry" in the "document 2" is filtered out.

Each line of the query results belongs to a same sub tree, which reflects the inter-relationship between the queried elements "{guaranteeAmount, debtorName, tel}".

On the other hand, if the wildcard method in the prior art is used to query "Document1.xml" and "Document2.xml", the query results will be as follows:

| Document1.xml | | |
|---|---|---|
| 100 | jack | 82899123 |
| 100 | jack | 82899456 |
| 100 | jack | 82899789 |
| 200 | jack | 82899123 |
| 200 | jack | 82899456 |
| 200 | jack | 82899789 |
| 100 | tom | 82899123 |
| 100 | tom | 82899456 |
| 100 | tom | 82899789 |
| 200 | tom | 82899123 |
| 200 | tom | 82899456 |
| 200 | tom | 82899789 |
| Document2.xml | | |
| 700 | john | 55588123 |
| 700 | john | 55588456 |
| 600 | john | 55588123 |
| 600 | john | 55588456 |
| 700 | marry | 55588123 |
| 700 | marry | 55588456 |
| 600 | marry | 55588123 |
| 600 | marry | 55588456 |

The inter-relationship between the queried elements is lost, and the results are not what the user expects.

As shown in FIG. 14, a flowchart of the method of this invention is discussed with XBRL as an example, including the following steps:

1401: processing the "schema 1" and "schema 2", so as to extract the nested relationship (e.g., Tables 1, 2) between elements of the "schema 1" and "schema 2".

1402: processing the XML "document 1" and "document2", so as to extract the reference relationship (e.g., Tables 4, 6) between the elements and the anchors thereof, and the nested relationship (e.g., Tables 3, 5) between the anchors. Further, the relationship between anchors "c1" and "c2" could be consolidated since they have a logically nested relationship.

The relationships extracted at steps 1401 and 1402 are stored in relationship repository 1420.

1403: configuring the constraint rule 1, constraint rule 2, and constraint rule 3.

The above steps 1401-1403 can be executed as pre-processing steps, and the related information can be pre-stored, for example, in the relationship repository 1420 or other databases. Thus, the embodiment of this invention can directly receive user inputs, and start from step 1404.

1404: receiving a query "{guaranteeAmount, debtorName, tel}"

1405: evaluating the query. Specifically, the constraint rules are applied to the query, based on the reference relationship (e.g., Tables 4, 6) between the elements {guaranteeAmount, debtorName, tel} and the anchor "c1" and "c2", and the nested relationship (e.g., Tables 3, 5) between the anchor "c" and "c2".

1406: reasoning and rewriting the query.

Figure 13A:
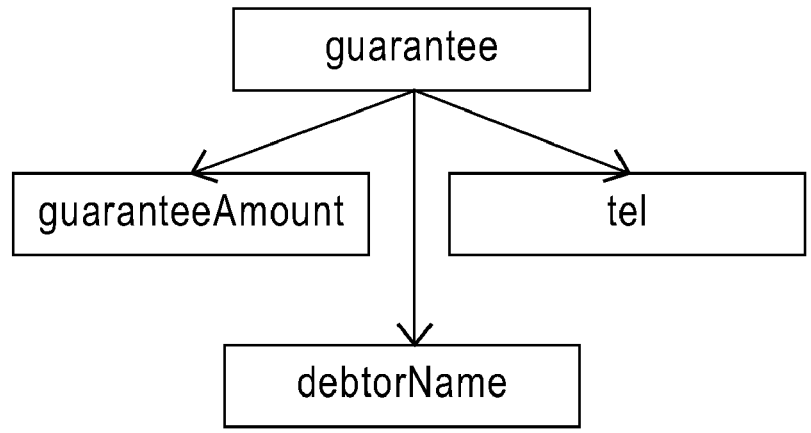
FIG. 13(a) shows a tree structure inferred backward from the queried elements based on the "schema 1"
Figure 13B:
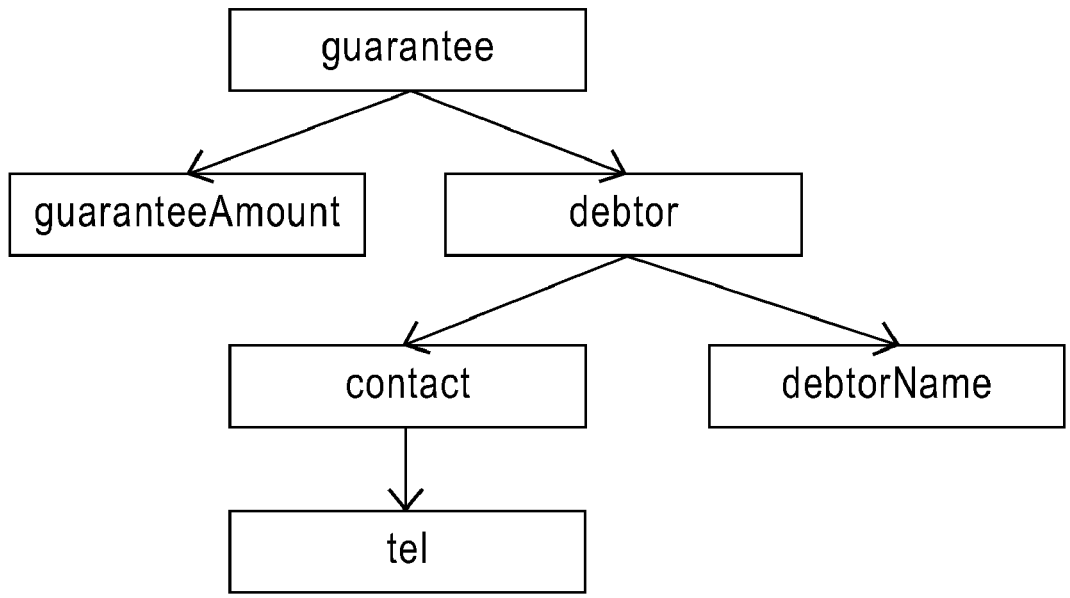
FIG. 13(b) shows a tree structure inferred backward from the queried elements based on the "schema 2"

For the queried elements {guaranteeAmount, debtorName, tel}, the tree structures of the queried elements in the "schema 1" and "schema 2" (as shown in FIGS. 13a and 13b) are inferred from the nested relationship between the elements produced at step 1401 (Tables 1-2). Then, with the tree structure, the query is rewritten into an XQuery/XPath to "document1" and "document2".

After the XQuery/XPath to the "document1" and "document2" are obtained, "document1" and "document2" are processed with the XQuery/XPath to output the expected results.

In the above process, "document1" and "document2" are based on the "schema1" and "schema2". However, schemaless documents can also be processed according to another embodiment of this invention. Still taking "document1" and "document2" as an example, in the case where "schema1" and "schema2" are not provided, the process for processing the query on "document1" and "document2" can include the following steps:

1401: being skipped;

1402: processing the XML "document1" and "document2", so as to extract the nested relationship between the elements (e.g., Tables 1-2), the nested relationship between the anchors referred by the elements (e.g., Tables 4, 6), and the nested relationship between the anchors (e.g., Tables 3, 5). The relationships extracted at step 1402 are stored in relationship repository 1420.

1403: configuring the constraint rule 1, constraint rule 2, and constraint rule 3.

1404: receiving a query "{guaranteeAmount, debtorName, tel}"

1405: evaluating the query. Specifically, the constraint rules are applied to the query, based on the reference relationship (e.g., Tables 4, 6) between the queried elements "{guaranteeAmount, debtorName, tel}" and the anchor "c" and "c2", and the nested relationship (e.g., Tables 3, 5) between the anchor "c" and 'c2".

1406: reasoning and rewriting the query.

Specifically, for the queried elements "{guaranteeAmount, debtorName, tel}", the tree structure of the queried elements is inferred from the nested relationship between the elements produced at step 1402 (Tables 1-2). Then, with the tree structures, the query is rewritten into an XQuery/XPath to "document1" and "document2".

1407: After the XQuery/XPath to "document1" and "document2" are obtained, "document1" and "document2" are processed with the XQuery/XPath to output the expected results. The details of processing "document1" and "document2" with the XQuery/XPath can be implemented by existing XML query techniques.

According to one preferred embodiment of this invention, step 1403, step 1404 and step 1405 can be carried out simultaneously so that users can configure the constraint rules at any moment, and users can input/select the constraint rules while inputting the query.

Figure 15:
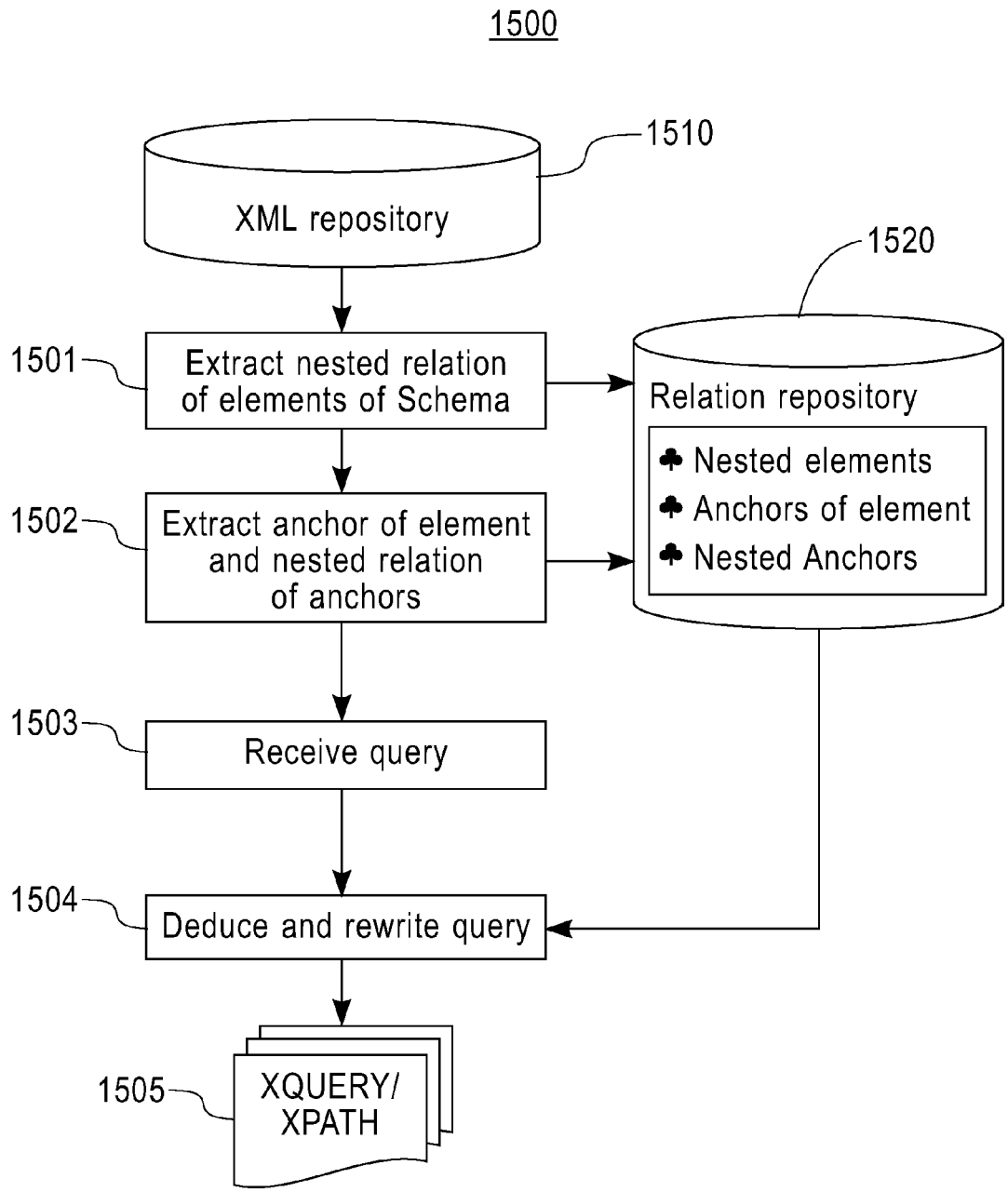
FIG. 15 shows a flowchart of the method according to another embodiment of the present invention.

FIG. 15 shows a flowchart of the method according to another embodiment of this invention. Different from FIG. 14, in the process shown in FIG. 15, the query evaluation step and the step for constraining the query are omitted. Specifically, the method in FIG. 15 includes the following steps (the description of the similar steps is omitted):

1501: processing the XML schemas to extract the nested relationship (Tables 1-2) between the elements in the schemas.

1502: processing "document1" and "document2" to extract the reference relationship (e.g., Tables 4, 6) between the elements and the anchors, and the nested relationship (e.g., Tables 3, 5) between the anchors. Further, since there is a logically nested relationship between the anchors "c1" and "c2", relationship between anchors "c1" and "c2" are built.

The XML schemas and the XML document instances can come from XML repository 1510. The XML repository 1510 can include syntax definitions, concept models, document instances, etc.

1503: receiving a query "{guaranteeAmount, debtorName, tel}".

1504: reasoning and rewriting the query. Specifically, based on the input query, the tree structure of the queried elements is inferred from the nested relationship (Tables 1-2) between the elements produced at step 1501. Then, the query is rewritten into an XQuery/XPath, and the documents are processed using the XQuery/XPath to obtain the expected results.

In the above embodiments, the present invention is discussed based on two document instances ("document1.xml", "document2.xml") with two schemas ("schema1.xsd", "schema2.xsd"), where "document1" is from "schema1", and "document2" is from "schema2". The present invention is not limited to this and is applicable to a group of XML document instances with one or more schemas, where any number of document instances can correspond to any schema.

Figure 16:
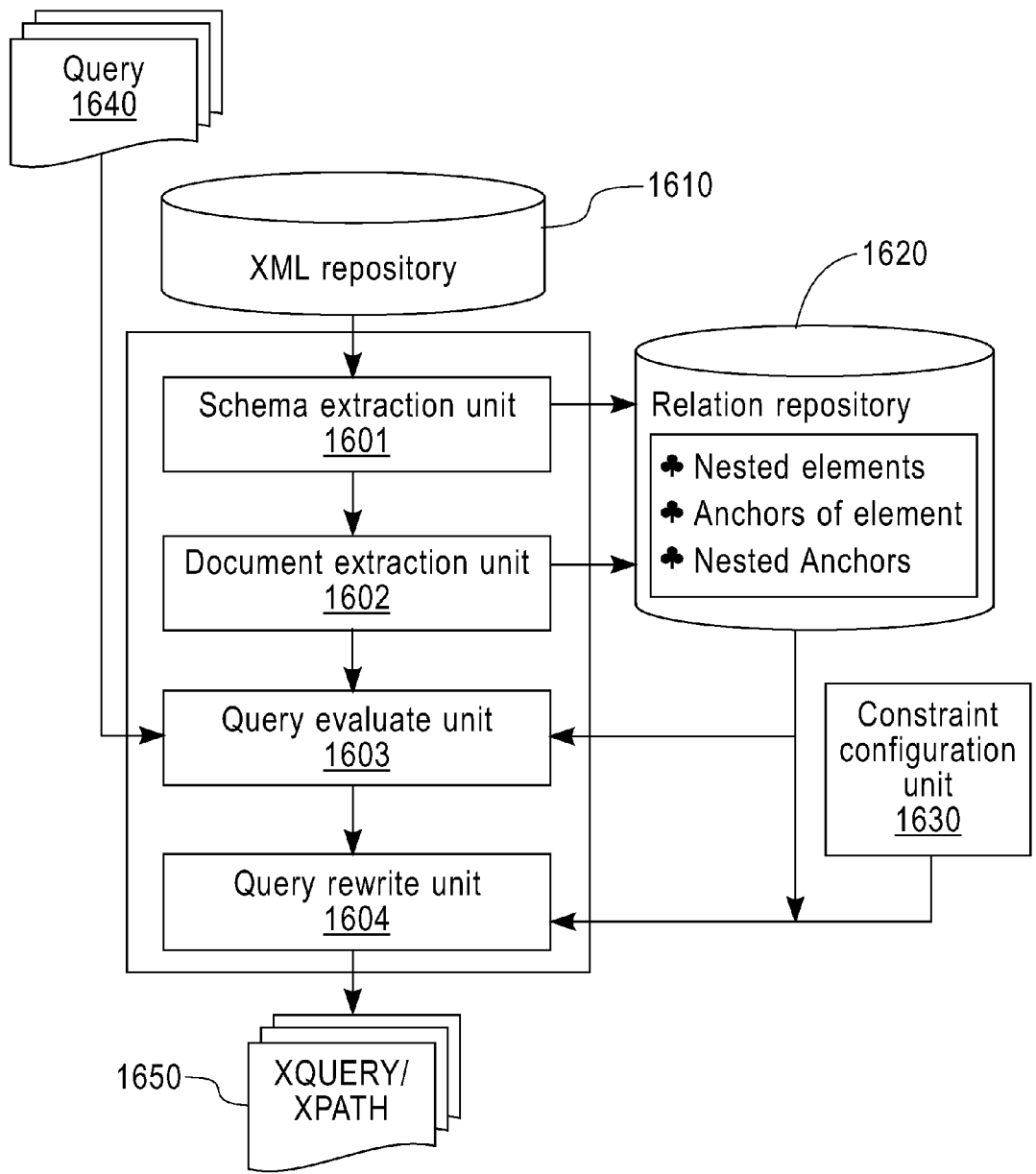
FIG. 16 shows a system construction according to another embodiment of the present invention.

FIG. 16 shows a system 1600 for generating an XQuery/XPath query according to one embodiment of this invention. Inputs of the system 1600 are: an XML repository 1610 including syntax definitions, concept models, document instances, etc; and a query input 1640. Outputs of system 1600 are: XQuery/XPath query 1650, which are used to retrieve data facts or establish path specific index for XML documents; and relationship repository 1620, which includes the extracted elements, sub trees and sub graphs.

According to one preferred embodiment of this invention, the system 1600 includes a schema extracting unit 1601, a document extracting unit 1602, a constraint configuring unit 1603, a query evaluating unit, a query rewriting unit 1604:

The schema extracting unit 1601 is used to process schemas to extract a nested relationship between elements in the schemas, where the nested relationship can be presented by either a form of tree structure diagram or one-dimensional table (e.g., Tables 1, 2);

The document extracting unit 1602 is used to process the document instances to extract the anchors of elements in the documents and a nested relationship between the anchors. The relationship between elements and the anchors thereof can be presented by either connections between multiple tree structure diagrams, or in a form of one-dimensional table (e.g., Tables 3-6).

According to the preferred embodiment, the schema extracting unit 1601 and the document extracting unit 1602 can generate the above information (Tables 1-6) and store it in the relationship repository 1620 for subsequent operation.

Further, in the system shown in FIG. 16, the schema extracting unit 1601 and the document extracting unit 1602 are implemented as separate modules. Alternatively, the schema extracting unit 1601 and the document extracting unit 1602 can be integrated into one single unit, that is, one single unit can be used to process those schemas and documents to extract necessary information.

A constraint configuring unit 1603 is used to configure the constraint rules. As an example, but not a limitation, the constraint rules can include at least one of the following:

Constraint rule 1: searching a minimal spanning tree containing queried elements; Actually, constraint rule 1 does not have any restriction on the contexts referred by queries elements Constraint rule 2: constraint rule 1; and the anchors that queried elements refer to are limited to anchors of one same tree in CDA;

Constraint rule 3: constraint rule 1; and the contexts that queried elements refer to are limited to one same anchor;

Other constraint rules or any combination thereof can be considered according to specific requirements.

The query evaluating unit is used to evaluate the query {queried element 1, queried element 2, . . . , queried element n} inputted by user to constrain the query based on the constraint rules configured by the constraint configuring unit 1603;

The query rewriting unit 1604 is used to, first, infer the tree structures between queried elements in different schemas "schema1", "schema2", . . . based on the nested relationship between the elements extracted by schema extracting unit 1601, secondly, rewrite the query {queried element1, queried element 2, . . . queried element n} inputted by user based on the constraint rules generated by the constraint configuring unit 1603 to get the XQuery/XPath of the elements for different schemas "schema1", "schema2", . . . .

The expected query results can be obtained by running the acquired XQuery/XPath on "document1" and "document2". The detailed implementations about processing "document1" and "document2" with XQuery/XPath are well known in the art, which can be implemented by known XML query techniques.

In the above description, the schema extracting unit 1601 and the document extracting unit 1602 are used to extract the relationship between various data elements so as to infer a tree structure of the queried elements. However, the above description is merely a demonstration rather than a limitation to this invention. The above tree structures can be extracted in other ways based on the technical teachings of this description. For example, a root node can be extracted from an XML document using known tool kits or programming libraries for parsing XML documents, such as Simple API for XML (SAX), extensible Stylesheet Language Transformations (XSLT), Document Object Model (DOM), etc. The tree structure can then be determined by extracting the sub nodes of the tree structures sequentially. These extracting methods are well known for the XML software developers.

Figure 17:
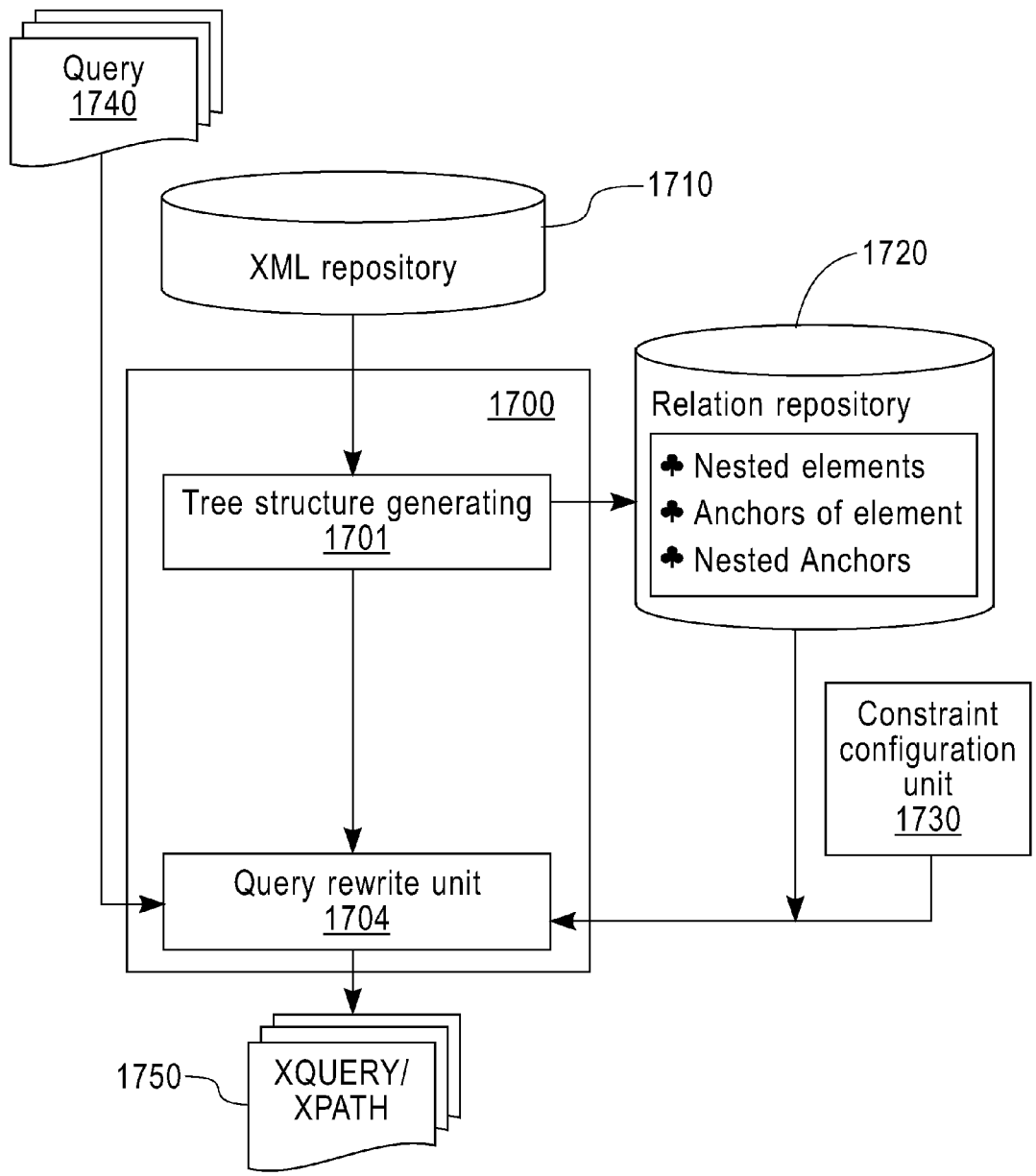
FIG. 17 shows a system construction according to another embodiment of the present invention.

Various modifications can be made to the system shown in FIG. 16 based on the enlightenment of this description. For example, FIG. 17 shows a block diagram of the system according to another embodiment of this invention, where teachings are given as to further variations and modifications. Here, same parts of system 1700 shown in FIG. 17 as that of system 1600 shown in FIG. 16 are not discussed anymore.

The system 1700 includes a tree structure generating unit 1701, which is used to generate tree structures to which the elements contained in the inputted query belong, of each document of the one or more XML documents. As can be understood by those skilled in the art, the tree structures can be extracted in various ways.

For example, XML document parsing tools, such as SAX, XSLT, DOM, etc can be used. The tree structure generating unit can further include a relationship extracting unit for extracting the relationship between elements in the one or more XML documents; and a reasoning unit for inferring the tree structures, to which the elements contained in the inputted query belong, of the documents, based on the relationship between the elements extracted by the extracting unit.

The system 1700 further includes a query rewriting unit 1704, which is used to generate an XQuery/XPath for each of the one or more XML documents, based on the tree structures and configurable constraint rules provided by the constraint configuring unit 1703, for example.

The query results returned from the above systems 1600 and 1700 can contain the inter-relationship between elements. In particular, it is not necessary for users to know every different schema of the XML documents. The processing by the system is transparent to users, which can greatly reduce the users' burden. Further, data consumers can configure the constraint rules in advance or select corresponding constraint rules upon inputting the query, thus a much more flexible query is possible.

The term "relationship repository" used herein can refer to any physical/logical entity capable of storing data. For example, the relationship repository can include one or more of the following: list, table, file data storage, relation database, data table, array, stack, etc. The database can reside in one logical and/or physical entity, or can be distributed among two or more logical and/or physical entities. The term "database" is intended to include database management system for controlling the organization, storage, and searching of data therein.

The term "element" used herein should be interpreted broadly and is not limited to any specific meaning. For example, it can refer to the "element" and "attribute" defined in XML specification/standards (in XML field, "element" and "attribute" are used interchangeably) so long as they do not prevent the implementation of this invention.

The terms "nested relationship" and "reference relationship" should be interpreted broadly. For example, it can refer to "part-of", "reference", and "association" relationship between elements of a tree structure.

Although the above embodiments are described in combination with CDA and XBRL, it shall be noted that this invention is not limited to these fields, and it can be applied to any schema variable XML-based documents.

All or some of the processes and methods of this invention can relate to electronic and/or software applications, which can be dynamical and flexible processes, and thereby can be executed in other order different from that described hereinabove. It is also possible to skip some of these steps for a simplified implementation. For example, in FIG. 14, as a pre-process, steps 1401-1402 are executed before step 1403. Alternatively, steps 1401-1402 can be executed after step 1403, i.e., executed after the query input. Alternatively, step 1401 and 1402 can be executed in an exchanged order. Furthermore, step 1403 and steps 1404/1405 in FIG. 14 can be executed synchronously, so that an instant constraint rule configuration is provided to users. In some circumstances, steps 1403, 1405 even can be omitted.

Those skilled in the art can understand that elements embodied as software can be implemented by various computer languages/techniques, such as machine language, programmable, object-oriented/artificial intelligence techniques.

While the present invention has been described with reference to the above embodiments, it should be understood that this invention is not limited to those specific embodiments. The scope of the appended claims is in accordance with its broadest explanation so as to include all the modifications and equivalent structures and functions thereof.

We claim:

1. A computer system for constructing a query to an XML document, wherein said query is from a client computer and said query contains an element of said XML document, said system comprising:
   a tree structure generating unit for generating a tree structure;
   a query rewriting unit for generating an XQuery/XPath for said XML document based on said tree structure and configurable query constraints;
   a constraint configuring unit for configuring a constraint rule; and
   a hardware device to execute said tree structure generating unit, said query rewriting unit, and said constraint configuring unit,
   wherein said element contained in said query from said client computer belongs to said XML document;
   wherein said XML document can be defined based on an XML schema or can be a schema-less document; and
   wherein said tree structure generating unit comprises:
   an extracting unit for extracting (i) a nested relationship between an element of a first XML document and an element of a second XML document; (ii) a nested relationship between an element from a first XML schema and an element from a second XML schema; (iii) a first anchor referred to by said element of said first XML document and a second anchor referred to by said element of said second XML document; and (iv) a nested relationship between said first anchor and said second anchor;
   a reasoning unit for inferring said tree structure, wherein said element contained in said query from said client computer belongs to said first XML document and said second XML document, based on said nested relationship extracted by said extracting unit; and optionally
   a relationship repository device for storing (i) said nested relationship between said element of said first XML document and said element of said second XML document and (ii) said nested relationship between said first anchors and said second anchor.

2. The system according to claim 1, wherein said constraint rule is selected from the group consisting of:
   (i) searching said minimal tree containing said element being queried, wherein an anchor referred to by said element being queried can be limited to an anchor from said minimal tree;
   (ii) searching said minimal tree containing said element being queried, wherein said anchor referred to by said element being queried can be limited to said anchor from said same tree and said anchor referred to by said element being queried is a leaf node of an anchor tree; and
   (iii) searching said minimal tree containing said element being queried, wherein said anchor referred to by said element is from said anchor tree and said anchor referred to by said element is a leaf node of said anchor tree.

3. The system according to claim 2, further comprising a query evaluating unit for constraining said query from said client computer on the basis of said constraint rules configured by said constraint configuring unit and said first and second anchors and said nested relationship between said first and second anchors extracted by said extracting unit.

4. A computer-implemented method for constructing a query to an XML document on a computer system, wherein said query includes an element of said XML document, said method comprising:
   receiving said query from a client computer;
   generating a tree structure;
   generating an XQuery/XPath for said XML document based on said tree structure and configurable query constraints by query-rewriting; and
   configuring a constraint rule,
   wherein said element included in said query belongs to said XML document;
   wherein said XML document can be defined based an XML schema or can be a schema-less document;
   wherein the step of generating said tree structure comprises the steps of:
   extracting (i) a nested relationship between an element of a first XML document and an element of a second XML document (ii) a nested relationship between an element from a first XML schema and an element from a second XML schema; (iii) a first anchor referred to by said element of said first XML document and a second anchor referred to by said element of said second XML document; and (iv) a nested relationship between said first anchor and said second anchor;

inferring said tree structure by reasoning, wherein said element included in said query belongs to said first XML document and said second XML document based on said nested relationship extracted at said extracting step; and optionally storing (i) said nested relationship between said element of said first XML document and said element of said second XML document and said nested relationship between said first and second anchors.

5. The method according to claim 4, wherein said constraint rule is selected from the group consisting of:
  (i) searching said minimal tree containing said element being queried, wherein an anchor referred to by said element being queried can be limited to an anchor from said minimal tree;
  (ii) searching said minimal tree containing said element being queried, wherein said anchor referred to by said element being queried can be limited to said anchor from said same tree and said anchor referred to by said element being queried is a leaf node of an anchor tree; and
  (iii) searching said minimal tree containing said element being queried, wherein said anchor referred to by said element is from said anchor tree and said anchor referred to by said element is a leaf node of said anchor tree.

6. The method according to claim 5, further comprising:
query-evaluating by constraining said query based on said constraint rules configured at said constraint configuring step and said first and second anchors and said nested relationship between said first and second anchors extracted at said extracting step.

* * * * *